United States Patent
Xu

(10) Patent No.: US 10,582,425 B2
(45) Date of Patent: Mar. 3, 2020

(54) METHOD AND NODES FOR HANDLING NETWORK CONNECTIONS

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 7 days.

(21) Appl. No.: 15/765,659

(22) PCT Filed: Oct. 14, 2015

(86) PCT No.: PCT/CN2015/091910
§ 371 (c)(1),
(2) Date: Apr. 3, 2018

(87) PCT Pub. No.: WO2017/063151
PCT Pub. Date: Apr. 20, 2017

(65) Prior Publication Data
US 2019/0082362 A1    Mar. 14, 2019

(51) Int. Cl.
*H04W 36/00*    (2009.01)
*H04W 76/12*    (2018.01)
(Continued)

(52) U.S. Cl.
CPC ......... *H04W 36/0027* (2013.01); *H04W 8/08* (2013.01); *H04W 36/0022* (2013.01);
(Continued)

(58) Field of Classification Search
CPC ................................................ H04W 36/0027
See application file for complete search history.

(56) References Cited

U.S. PATENT DOCUMENTS 8,566,455 B1    10/2013    Zhao et al.
2010/0232407 A1   9/2010   Navali et al.
(Continued)

FOREIGN PATENT DOCUMENTS

CN    102282889 A    12/2011
CN    102474771 A    5/2012
(Continued)

OTHER PUBLICATIONS

Communication Regarding European Search Report for European patent application No. EP 15 90 6036 dated Feb. 22, 2019, 9 Pages.
(Continued)

*Primary Examiner* — John D Blanton
(74) *Attorney, Agent, or Firm* — Sage Patent Group

(57) ABSTRACT

The embodiments herein relate to a method performed by a mobility node for handling network connections for a UE. The UE is simultaneously connected to a first gateway via a connection to a 3GPP network and a connection to a non-3GPP network. The mobility node detects that the UE has moved to another location. The mobility node selects a second gateway that the UE should be relocated to. The second gateway is closer to the UE at the other location. The mobility node transmits relocation information to the first gateway. The relocation information indicates that a gateway relocation to the second gateway is required for the UE. The gateway relocation involves deactivation of both the connection to the 3GPP and the non-3GPP network.

22 Claims, 14 Drawing Sheets

(51) Int. Cl.
*H04W 36/12* (2009.01)
*H04W 76/30* (2018.01)
*H04W 8/08* (2009.01)
*H04W 36/32* (2009.01)
*H04W 88/16* (2009.01)

(52) U.S. Cl.
CPC ......... *H04W 36/125* (2018.08); *H04W 36/32* (2013.01); *H04W 76/12* (2018.02); *H04W 76/30* (2018.02); *H04W 88/16* (2013.01)

(56) References Cited

U.S. PATENT DOCUMENTS

| | | | | |
|---|---|---|---|---|
| 2011/0271117 | A1* | 11/2011 | Qiang | H04L 63/164 713/181 |
| 2012/0142353 | A1 | 6/2012 | Jha et al. | |
| 2014/0016553 | A1* | 1/2014 | Nishida | H04W 76/34 370/328 |
| 2014/0078986 | A1* | 3/2014 | Kaippallimalil | H04W 76/10 370/329 |
| 2014/0126541 | A1* | 5/2014 | Zembutsu | H04W 36/00 370/331 |
| 2016/0302120 | A1* | 10/2016 | Draznin | H04W 36/12 |
| 2017/0188275 | A1* | 6/2017 | Kim | H04W 76/10 |
| 2017/0238223 | A1* | 8/2017 | Zhou | H04W 36/00 370/328 |
| 2017/0366960 | A1* | 12/2017 | Kim | H04W 8/08 |

FOREIGN PATENT DOCUMENTS

| | | |
|---|---|---|
| EP | 2 112 841 A1 | 10/2009 |
| EP | 2 887 733 A1 | 6/2015 |
| WO | WO 2013/042330 A1 | 3/2013 |
| WO | WO 2014/113084 A1 | 7/2014 |
| WO | WO 2015/069551 A1 | 5/2015 |

OTHER PUBLICATIONS

Sankaran, C.B., "Data Offloading Techniques in 3GPP Rel-10 Networks: A Tutorial," LTE-Advanced and 4G Wireless Communications: Part 2, IEEE Communications Magazine, Jun. 2012, 8 pages.

International Search Report and Written Opinion of the International Searching Authority for International Application No. PCT/CN2015/091910 dated Jul. 1, 2016, 6 pages.

Gundavelli et al., "Proxy Mobile IPv6," Network Working Group, Request for Comments: 5213, Category: Standards Track, 92 pages (Aug. 2008).

"Re-Select Local PGW for IMS APN when UE Roams Crossing Regions Within one PLMN," Ericsson, 432/0363-13/FCP111381 Uen, Rev PA9, 39 pages (Jul. 24, 2015).

3GPP TS 23.402 V12.8.0, 3rd Generation Partnership Project; Technical Specification Group Services and System Aspects; Architecture enhancements for non-3GPP accesses (Release 12), 290 pages (Mar. 2015).

3GPP TS 23.401 V12.8.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), 308 pages (Mar. 2015).

3GPP TS 29.274 V12.6.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), 313 pages (Sep. 2014).

3GPP TS 23.261 V12.0.0, 3rd Generation Partnership Project; Technical Specification Group Services and System Aspects; IP flow mobility and seamless Wireless Local Area Network (WLAN) offload; Stage 2 (Release 12), 22 pages (Sep. 2014).

\* cited by examiner

METHOD AND NODES FOR HANDLING NETWORK CONNECTIONS

CROSS REFERENCE TO RELATED APPLICATION

This application is a 35 U.S.C. § 371 national stage application of PCT International Application No. PCT/CN2015/091910, filed on Oct. 14, 2015, the disclosure and content of which is incorporated by reference herein in its entirety.

TECHNICAL FIELD

Embodiments herein relate generally to a mobility node, a method performed by the mobility node, a first gateway and a method performed by the first gateway. More particularly the embodiments herein relate to handling network connections for a User Equipment (UE).

BACKGROUND

Currently, there are several methods defined by the Third Generation Partnership Project (3GPP) related to data offloading: Local Internet Protocol Access (LIPA), Selected Internet Protocol Traffic Offload (SIPTO) and Internet Protocol Flow Mobility (IFOM).

IFOM is a method where a UE has data sessions with the same Packet Data Network (PDN) connection simultaneously over a 3GPP network and a WiFi network. A PDN Connection is an association between a UE and a PDN, represented by an Internet Protocol (IP) address. A PDN is identified by an Access Point Name (APN). Based on the scenario, the UE could add or delete data sessions over either of the network accesses, effectively offloading data. While the data offload is largely transparent to the UE in LIPA and SIPTO, the logic to offload data is more UE centric in IFOM and largely transparent to the Radio Access Network (RAN). Network Based-IFOM (NB-IFOM, NBIFOM) is a variant of IFOM which relates to IP Flow Mobility using network-based mobility protocols (e.g. on the S2a and S2b interface via the General packet radio service Tunneling Protocol (GTP) mobility and using a Proxy Mobile IPv6 (PMIP) mobility procedure). Network based IFOM is contrary to client based IFOM which relates to the S2c interface via a Dual-stack Mobile IPv6 (DSMIP) procedure.

SIPTO is a method where portions of the IP traffic on a Home (evolved) NodeB (H(e)NB) or a cellular network is offloaded to a local network, in order to reduce the load on the system. The target network entity could be a H(e)NB or another gateway in the cellular network that is geographically closer located to the UE. SIPTO can be triggered by events like UE mobility, special occasions that leads to concentration of traffic or other network rules. The basic idea of SIPTO is to select a Serving Gateway (SGW) and a PDN GateWay (PGW) topologically and geographically closer to the radio network (for both Fourth Generation (4G) and Third Generation (3G) networks) and to the Mobility Management Entity (MME), and to use them to offload data.

FIG. 1 illustrates an example of IFOM. FIG. 1 illustrates an EPC core network 100a. EPC is short for Evolved Packet Core. In FIG. 1, the UE 101 is adapted to be served by a base station 103 in the EPC core network 100a.

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The base station 103 may represent a 3GPP network. The base station 103 may be referred to as e.g. evolved Node B (eNB), eNodeB, NodeB, B node, Radio Base Station (RBS), Base Transceiver Station (BTS), Radio Network Controller (RNC) depending on the technology and terminology used. The base station 103 is adapted to communicate over an air interface operating on radio frequencies with the UEs 101 within range of the base station 103.

The EPC core network 100a comprises core network nodes such as a SGW 105, a PGW 108 and a MME 110. The EPC core network 100a may comprise additional core network nodes which are not illustrated in FIG. 1. The base station 103 is adapted to be connected to both the SGW 105 and the MME 110. The MME 110 and the SGW 105 are adapted to be connected to each other. The SGW 105 is adapted to be connected to the PGW 108.

The SGW 105 is a gateway which is adapted to e.g. routes and forwards user data packets, while also acting as the mobility anchor for a user plane during inter-eNB handovers and as the anchor for mobility between Long Term Evolution (LTE) and other 3GPP technologies.

The PGW 108 is a gateway which terminates an interface towards the PDN (not illustrated in FIG. 1). If the UE 101 is accessing multiple PDNs, there may be more than one PGW 108 for that UE 101. Functions of the PGW 108 are e.g. providing connectivity from the UE 101 to external PDNs by being the point of exit and entry of traffic for the UE 101, performing policy enforcement, packet filtering for each user, charging support, lawful interception and packet screening etc. The PGW 108 may be co-located with a Home Agent (HA). This may also be described as the HA functionality is implemented in the PGW 108. Such co-located node may be referred to as a HA/PGW. According to the 3GPP, the HA is a mobile Internet Protocol version 4 (IPv4) router on a UE's 101 home network which tunnels datagrams for delivery to the UE 101 while it is registered on a visited network. The term HA mentioned above may be described as a router which maintains information about the UEs 101 current location. The reference number 108 will also be used for referring to the co-located HA/PGW node. The PGW part of the HA/PGW 108 or the standalone PGW 108 is a gateway or gateway functionality which is arranged to act as an anchor between the 3GPP access and the non-3GPP access 115, it provides connectivity from the UE 101 to the PDN etc.

The SGW 105 and the PGW 108 may be implemented in one common physical node or in separate physical nodes.

The MME 110 is a core network node having functions such as e.g. Non-Access Stratum (NAS) signalling, Inter Core Network (CN) node signalling for mobility between 3GPP access networks, UE reachability, Tracking Area (TA) list management, PGW and SGW selection, MME selection for handover with MME change etc. The MME 110 may be a standalone MME node or it may be a combined MME and Serving General packet radio service Support Node (SGSN) node, i.e. a node where the MME and SGSN are co-located. In the following, the abbreviation MME may refer to a standalone MME or a combined MME and SGSN node. The reference number 110 is used for referring to the standalone MME and to the combined MME and SGSN node.

FIG. 1 also illustrates a non-3GPP network 115. The non-3GPP network 115 (or nodes in the non-3GPP network 115) may be adapted to be connected to the PGW 108 in the EPC core network 100a, i.e. the PGW 108 is adapted to be connected to both the SGW 105 and the non-3PGP network 115. The non-3GPP network 115 may be for example a WiMAX network, CDMA 2000 network, Wireless Local Area Network (WLAN) or a fixed network. The non-3GPP network 115 may be trusted or non-trusted. The trusted and non-trusted versions of the non-3GPP network 115 will be described in more detail later.

The two arrows seen in FIG. 1 represent PDN connections for the UE 101. The left arrow represents the PDN connection via the 3GPP network and the right arrow represents the PDN connection via the non-3GPP network 115. Both the PDN connection via the 3GPP network and the PDN connection via the non-3GPP network 115 are for the same APN.

FIG. 2 illustrates an example of SIPTO. As depicted in FIG. 2, SITPO in a macro network 100b can have different data paths for a certain service comparing to the one of the UE's 101 regular PDN connection. A macro network 100b may be described as a network that provides radio coverage served by a high power base station. For example, a macro network 100b provides a larger coverage than a micro network. FIG. 2 also illustrates an EPC core network 100a comprising one or more core network nodes. In FIG. 2, the UE 101 is adapted to be served by the base station 103 in the macro network 100b. The base station 103 in FIG. 2 may be for example a high power base station. The interface between the UE 101 and the base station 103 is referred to as an LTE-Uu interface. The base station 103 is connected to the EPC core network 100a via the SGW 105 via a S1-U interface. The SGW 105 is adapted to be connected to two PGWs, i.e. the PGW1 108a and the PGW2 108b, via a respective S5 interface. SGi is the interface between each of the PGWs 108a, 108b and external PDN nodes (not illustrated in FIG. 2). The reference number 108 without a or b refers to any of the two PGWs.

The SGW 105 is also adapted to be connected to the MME 110 via a S11 interface. The MME 110 is also adapted to be connected to the base station 103 via a S1-MME interface. The SGW 105, the PGW1 108a, the PGW2 108b and the MME 110 are core network nodes which are comprised in the EPC core network 100a. A regular data path is illustrated with a solid arrow in FIG. 2, and is a data path that goes via the PGW2 108b. The SIPTO data path is illustrated with a dotted arrow in FIG. 2, and is a data path that goes via the PGW1 108a.

It is also possible that the EPC core network (e.g. the SGSN/MME 110 or any other suitable node in the EPC core network 100a) determines to relocate the PGW 108 when UE 101 is connected to the 3GPP access and moving within/between Public Land Mobile Networks (PLMNs). Some operators in e.g. China require such kind of "local breakout" for its national roaming subscribers. The PDN disconnection is similar to SIPTO, but the decision to change the PGW 108 is implementation specific. By changing the PGW 108, the UE 101 can have a better user plane optimization (e.g. a PGW 108 closer to the UE 101 location), and also with a correct dialing plan and charging for Voice over LTE (VoLTE) call.

As soon as the SGSN/MME 110 determines to relocate the PGW 108 for the UE 101, it transmits a PDN Deactivation Request message (with reactivation required) or a Detach message (with re-attach required) to the UE 101. Thereby the UE 101, as per standard stipulated, will re-establish the PDN connection to the EPC, i.e. the connection to the 3GPP network and the new PGW 108 will then be used.

FIG. 3 depicts the PGW 108 relocation as the UE 101 moves from one to another location. The UE 101 moves from being served by the base station1 103a to being served by the base station2 103b. The reference number 103 without the letters a and b refers to any of the base stations. Both base stations 103a, 103b are connected to the same MME 110 in the EPC core network 100a. Before the UE 101 moves, the PGW1 108a is used for data transmission. The data path before the movement is indicated with a dotted arrow in FIG. 3. After the UE 101 has moved, the PGW2 108b (the PGW2 108b is topologically/geographically closer to the UE 101 compared to the PGW1 108a) is chosen for an optimized data transmission. The data path after the movement is indicated with a solid arrow in FIG. 3.

As stipulated by 3GPP, all simultaneous active PDN connections of a UE 101 that are associated with the same APN shall be provided by the same PGW 108.

When IFOM is used for a UE 101 utilizing both non-3GPP network 115 (trusted or untrusted) and 3GPP network in the context of EPC, and a HA is collocated with the PGW 108, the relocation of the PGW 108 (PGW 108 does not release the resources for another access) will lead to that a different PGW 108 is used for the same APN. This is not allowed since the PGW 108 is the IP anchor point in the PDN network regardless of which access network that is used. Therefore, by such blindly PGW relocation, the old PGW 108 still has the hanging resources, an unexpected behavior might happen in the UE 101 and the remote server of an external PDN due to change of IP address.

SUMMARY

An objective of embodiments herein is therefore to provide improved handling of network connections.

According to a first aspect, the object is achieved by a method performed by a mobility node for handling network connections for a UE. The UE is simultaneously connected to a first gateway via a connection to a 3GPP network and a connection to a non-3GPP network. The mobility node detects that the UE has moved to another location. When it is detected that the UE has moved to another location, the mobility node selects a second gateway that the UE should be relocated to. The second gateway is closer to the UE at the other location. The mobility node transmits relocation information to the first gateway. The relocation information indicates that a gateway relocation to the second gateway is required for the UE. The gateway relocation involves deactivation of both the connection to the 3GPP network and the connection to the non-3GPP network.

According to a second aspect, the object is achieved by a method performed by a first gateway for handling network connections for the UE. The UE is simultaneously connected to the first gateway via a connection to a 3GPP network and a connection to a non-3GPP network. The first gateway receives relocation information from a mobility node. The relocation information indicates that a gateway relocation to a second gateway is required for the UE. The mobility node determines whether the first gateway has both 3GPP and non-3GPP connections for the same PDN. When the first gateway has both 3GPP and non-3GPP connections, the first gateway determines, based on the received relocation information, whether the connection to the non-3GPP network should be deactivated. The first gateway transmits non-3GPP deactivation instructions to the UE to deactivate its connection to the non-3GPP network.

According to a third aspect, the object is achieved by a mobility node for handling network connections for a UE. The UE is adapted to be simultaneously connected to a first gateway via a connection to a 3GPP network and a connection to a non-3GPP network. The mobility node is adapted to detect that the UE has moved to another location. The mobility node is adapted to, when it is detected that the UE has moved to another location, select a second gateway that the UE should be relocated to. The second gateway is closer to the UE at the other location. The mobility node is further adapted to transmit relocation information to the first gateway. The relocation information indicates that a gateway relocation to the second gateway is required for the UE. The gateway relocation involves deactivation of both the connection to the 3GPP network and the connection to the non-3GPP network.

According to a fourth aspect, the object is achieved by a first gateway for handling network connections for a UE. The UE is adapted to be simultaneously connected to the first gateway via a connection to a 3GPP network and a connection to a non-3GPP network. The first gateway is adapted to receive relocation information from a mobility node. The relocation information indicates that a gateway relocation to a second gateway is required for the UE. The first gateway is further adapted to determine whether the first gateway has both 3GPP and non-3GPP connections for the same PDN. The first gateway is adapted to, when the first gateway has both 3GPP and non-3GPP connections, determine, based on the received relocation information, whether the connection to the non-3GPP network should be deactivated. The first gateway is adapted to transmit non-3GPP deactivation instructions to the UE to deactivate its connection to the non-3GPP network.

Since the relocation information which indicates that the gateway relocation to the second gateway is required for the UE, the mobility node decides to deactivate the connection to the 3GPP network and the first gateway decides to deactivate the connection to the non-3GPP network. Thus, the first gateway does not have any hanging connections to the non-3GPP network when the gateway relocation is performed, which improves the handling of the network connections.

Embodiments herein afford many advantages, of which a non-exhaustive list of examples follows:

The feature interaction is resolved in cases when the PGW needs to be relocated and IFOM is used. Thus optimized user plane can be achieved and potential hanging resource in the old PGW and its peers can be avoided.

Another advantage of the embodiments herein is that only the core network is impacted without modification of any existing UE supporting IFOM or NB-IFOM.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
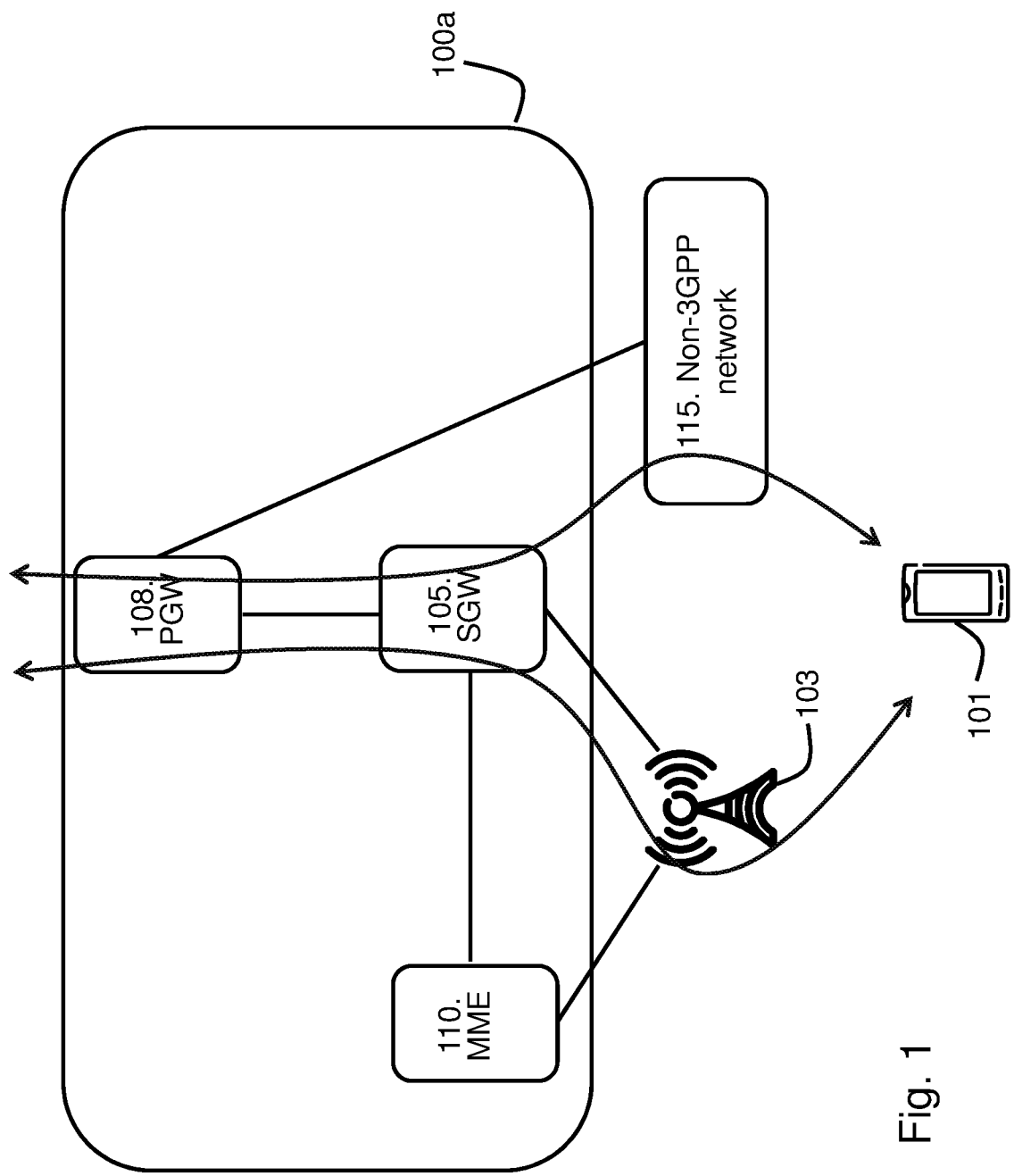
FIG. 1 is a schematic block diagram illustrating embodiments of IFOM.
Figure 2:
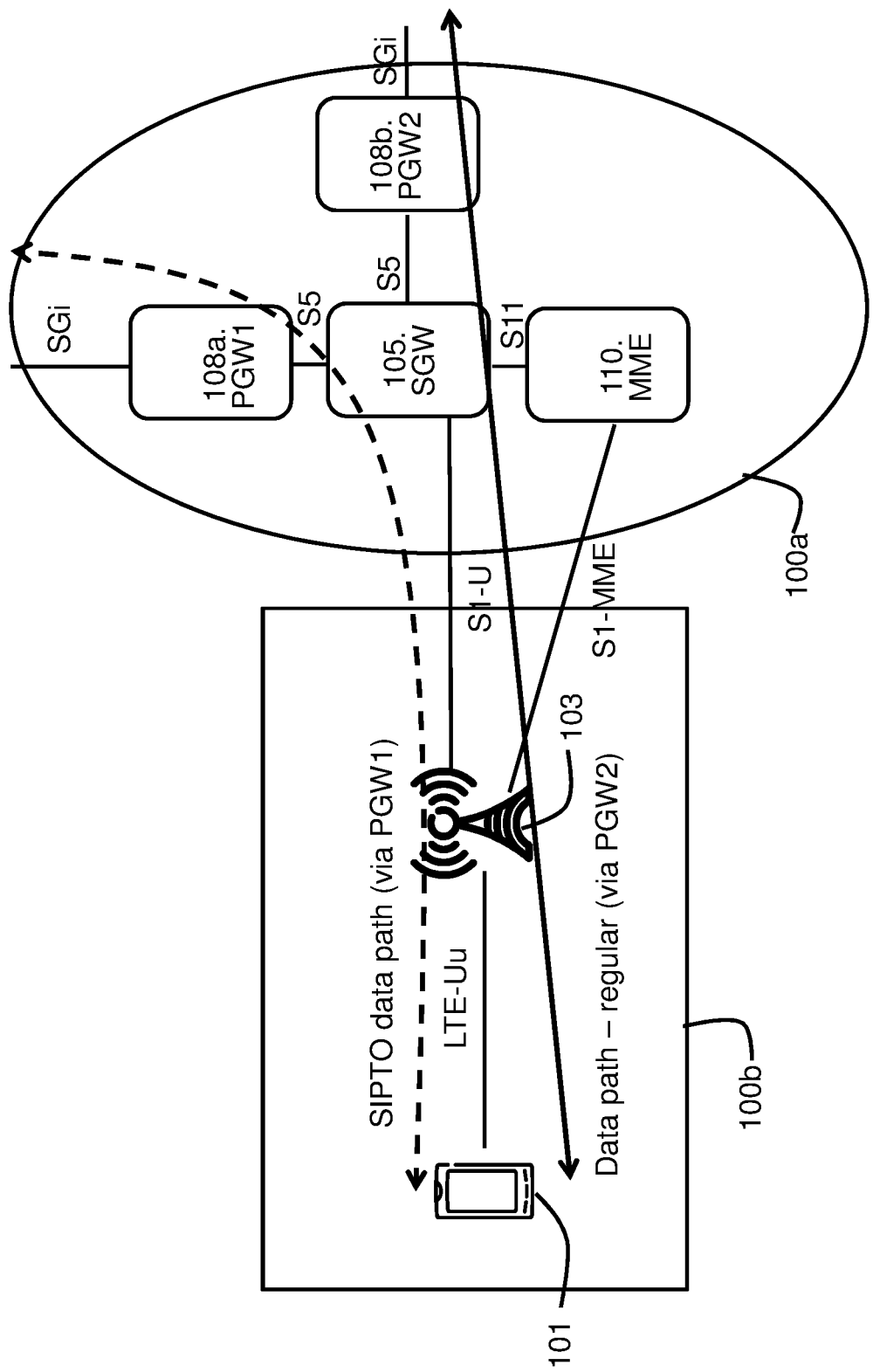
FIG. 2 is a schematic block diagram illustrating embodiments of SIPTO in a macro network.
Figure 3:
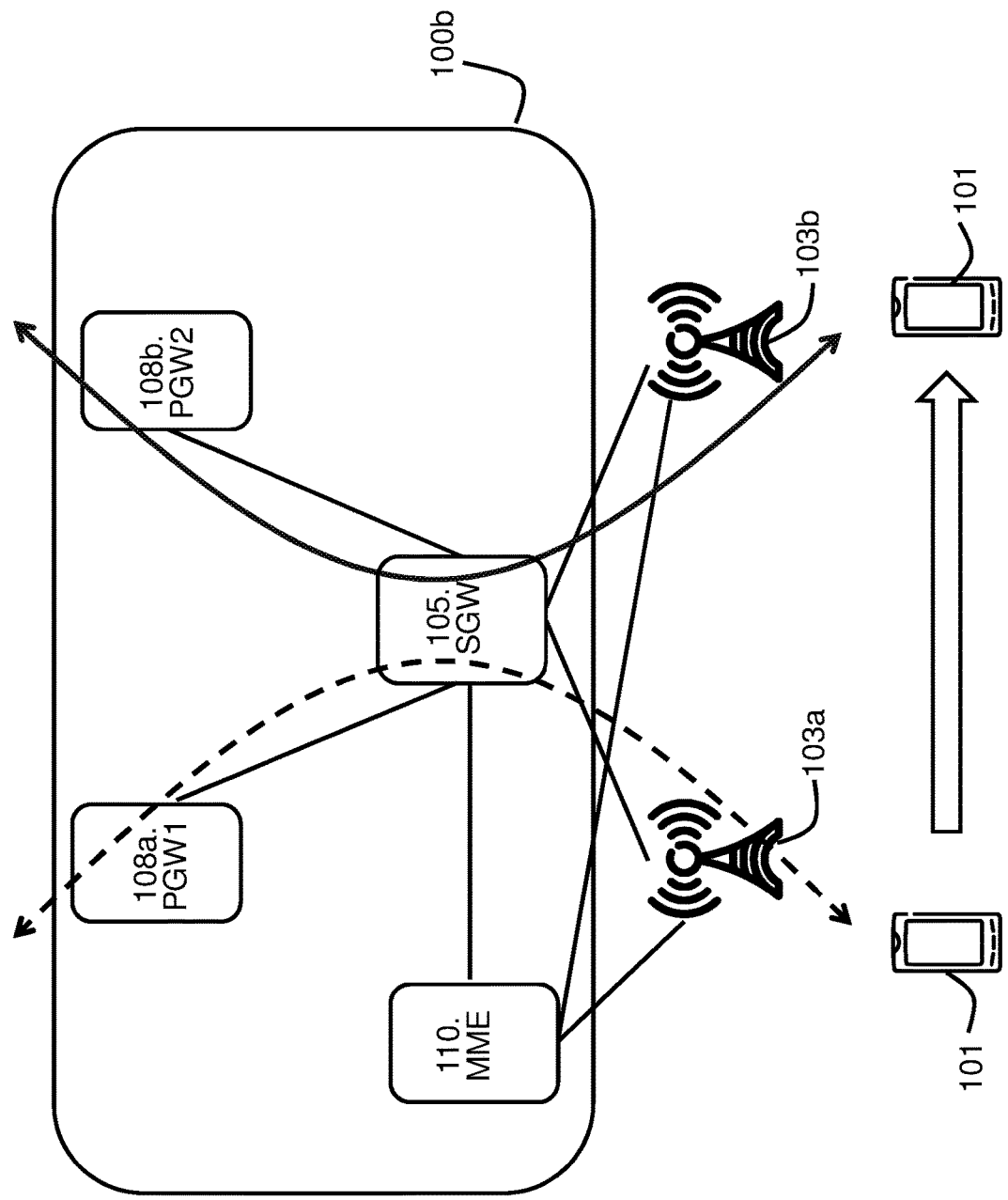
FIG. 3 is a schematic block diagram illustrating embodiments of relocation of a PGW during UE movement.
Figure 4:
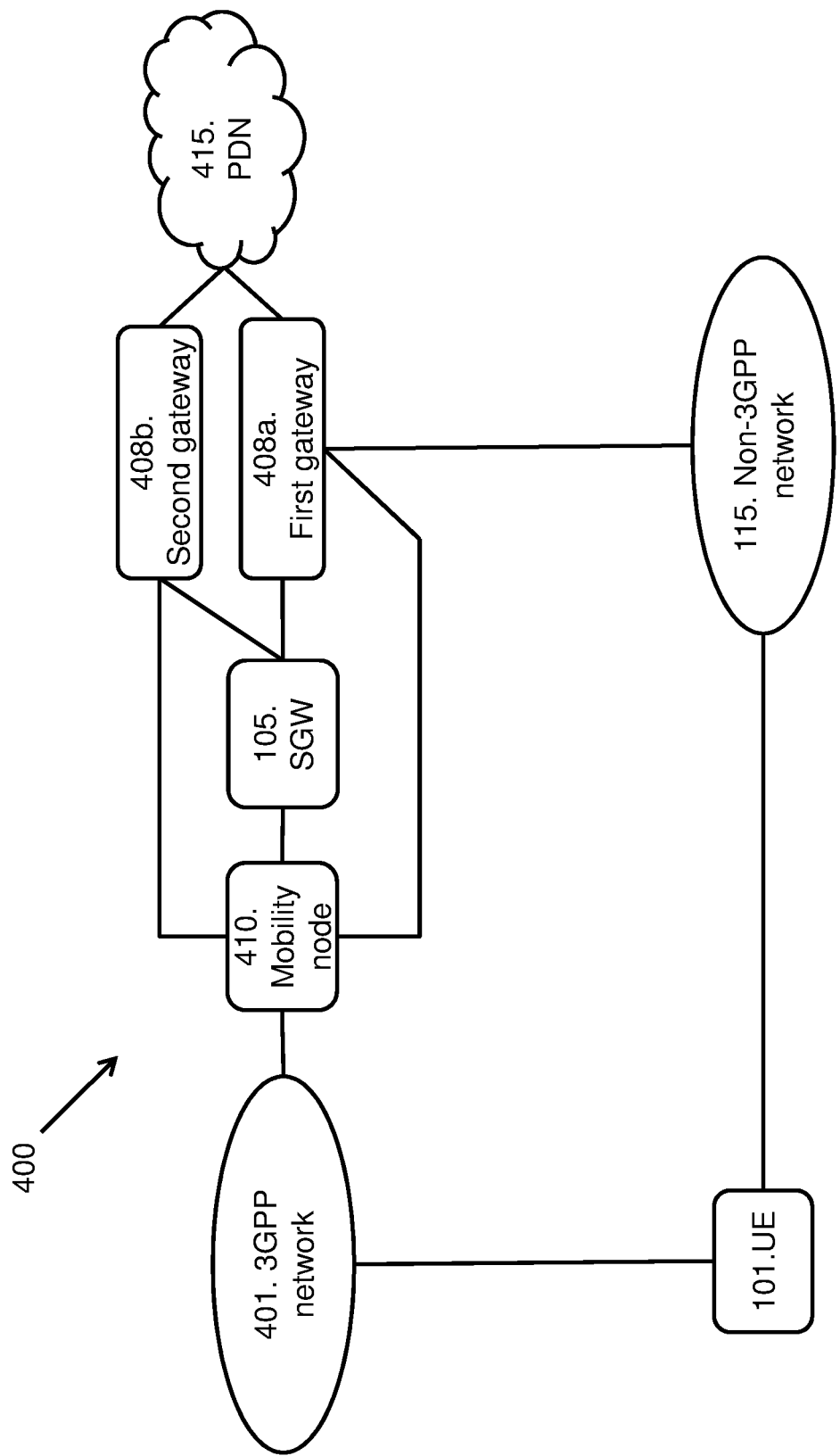
FIG. 4 is a schematic block diagram illustrating embodiments of a wireless communications system.

FIG. 4 depicts a wireless communications system 400 in which embodiments herein may be implemented. The wireless communication system 400 may also be referred to as a wireless communications network, a communications system, a communications network, a network or a system.

The wireless communications system 400 comprises one or more UEs 101 which is adapted to be connected to and to access a 3GPP network 401 and a non-3GPP network 115.

The UE 101 may be a device by which a subscriber may access services offered by an operator's network and services outside operator's network to which the operators radio access network and core network provide access, e.g. access to the Internet. The UE 101 may access services provided by the 3GPP network 401 or the non-3GPP access 115, or both the 3GPP network 401 and the non-3GPP network 115. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, M2M device, D2D device, IoT device or any type of consumer electronic, for instance but not limited to television, radio, lighting arrangements, tablet computer, laptop or PC. The UE 101 may be portable, pocket storable, hand held, computer comprised, or vehicle mounted devices, enabled to communicate voice and/or data, via the radio access network, with another entity, such as another UE or a server.

The UE 101 may reach a CN or a core network node using any of the access networks, e.g. the 3GPP network 401 or the non-3GPP network 115.

The 3GPP network 401 may comprise a GERAN and UTRAN or an E-UTRAN or both GERAN/TRAN and E-UTRAN or any other 3GPP RAN technology. Each of the GERAN/UTRAN and E-UTRAN may be referred to as RANs. Each of the GERAN/UTRAN and E-UTRAN may comprise a respective base station (not shown in FIG. 4). GERAN is short for GSM EDGE Radio Access Network, where GSM is short for Gobal System for Mobile communications and EDGE is short for Enhanced Data rates for Global Evolution. UTRAN is short for Universal Terrestrial Radio Access Network and E-UTRAN is short for Evolved-UTRAN.

The base station may be for example a NodeB, an eNB, a RBS, a BTS, a RNC, or any other network unit capable to communicate over a radio carrier with the UE 101 being in range of the respective base station 103. The base station may be serving the UE 101.

The non-3GPP network 115 may be a trusted non-3GPP network or an untrusted non-3GPP network. A trusted non-3GPP network is capable of interacting directly with a CN or a core network node and an untrusted 3GPP-access is capable of interacting with the CN or the core network node only via a gateway node, such as e.g. an evolved Packet Data Gateway (ePDG) (not shown in FIG. 4). The 3GPP network 401 may also be referred to as a 3GPP access network or a 3GPP access and the non-3GPP access 115 may be referred to as a non-3GPP access or a non-3GPP access network.

The 3GPP network 401 may be described as the network access for the UE 101 which is specified by the 3GPP and may include for example GERAN, UTRAN and E-UTRAN. Non-3GPP network 115 means that the network access is not specified by the 3GPP. The non-3GPP network 115 may include e.g. WiMAX, CDMA 2000, WLAN or fixed networks.

The wireless communications system 400 may further comprise a first gateway 408a and second gateway 408b. These two gateways 408a, 408b may be adapted to be connected to each other. The first gateway 408a may be described as the gateway which is currently serving the UE 101 and the second gateway 408b may be the gateway which is adapted to serve the UE 101 at some other time, for example when the UE 101 moves and becomes geographically closer located to the second gateway 408b compared to the first gateway 408a. A gateway may be seen as an IP anchor point. The first gateway 408a may also be referred to as a current gateway and the second gateway 408b may be referred to as another gateway. The first gateway 408a may be for example a standalone Home Agent, HA, a combined HA and PGW (the combined HA and PGW is referred to as HA/PGW), or a combined HA and GGSN. GGSN is short for Gateway GPRS Support Node and GPRS is short for General Packet Radio Services. GGSN may be described as being responsible for the interworking between the GPRS network and external packet switched networks, like the Internet and X.25 networks. Similarly, the second gateway 408b may be a standalone HA, a combined HA and PGW, or a combined HA and GGSN (the combined HA and GGSN is referred to as HA/GGSN). The non-3GPP network 115 may be adapted to be connected to the first gateway 408a, and possibly connected to the second gateway 408b as well. When the reference number 408 is used herein, it refers to any of the first gateway 408a and the second gateway 408b.

A mobility node 410 is comprised in the wireless communication system 400 and is adapted to be connected to the 3GPP network 401, the first gateway 408a, the second gateway 408b and the SGW 105. The mobility node 410 may be a MME, a SGSN or a combined MME and SGSN node.

The SGW 105 is comprised in the wireless communication system 400 and is adapted to be connected to the mobility node 410, the first gateway 408a and the second gateway 408b. The SGW 105 may be co-located with either the first gateway 408a or the second gateway 408b.

Table 1 below illustrates some example combinations of the first gateway 408a, the second gateway 408b and the mobility node 410 in the wireless communication system 400:

TABLE 1

| 408a. First gateway | 408b. Second gateway | 410. Mobility node |
|---|---|---|
| HA | HA | MME/SGSN |
| HA | HA/PGW | MME/SGSN |
| HA | HA/GGSN | MME/SGSN |
| HA/PGW | HA | MME/SGSN |
| HA/PGW | HA/PGW | MME/SGSN |
| HA/PGW | HA/GGSN | MME/SGSN |
| HA/GGSN | HA | MME/SGSN |
| HA/GGSN | HA/PGW | MME/SGSN |
| HA/GGSN | HA/GGSN | MME/SGSN |

The first gateway 408a, the second gateway 408b, the SGW 105 and the mobility node 110 may be seen as being comprised in a core network, and may be seen as separate nodes or entities in the core network or they may be functions which for example are implemented in one node. In case they are functions implemented in one node, the node may for example be referred to as a control plane node which comprises the functionalities of at least some of the mobility node 110, SGW 105, first gateway 408a, second gateway 408b, and possibly other CN functionalities. The control plane node is then a node which handles substantially all control plane functions of the core network. In addition, there may be a user plan node (not shown in FIG. 4) so that the control plane and the user plane functionalities are handled by separate nodes.

The wireless communication system 400 may comprise a PDN 415 to which both the first gateway 408a and the second gateway 408b are adapted to be connected. The PDN 15 is an external network such as for example the Internet. As mentioned earlier, a PDN connection is an association between a UE 101 and a PDN 415, represented by an IP address. The PDN 415 is identified by an APN.

It should be noted that the communication links or connections between the entities or nodes in the wireless communications system 400 may be of any suitable kind including either a wired or wireless link. The links or connections may use any suitable protocol depending on type and level of layer (e.g. as indicated by the Open Systems Interconnection (OSI) model) as understood by the person skilled in the art.

Figure 5A:
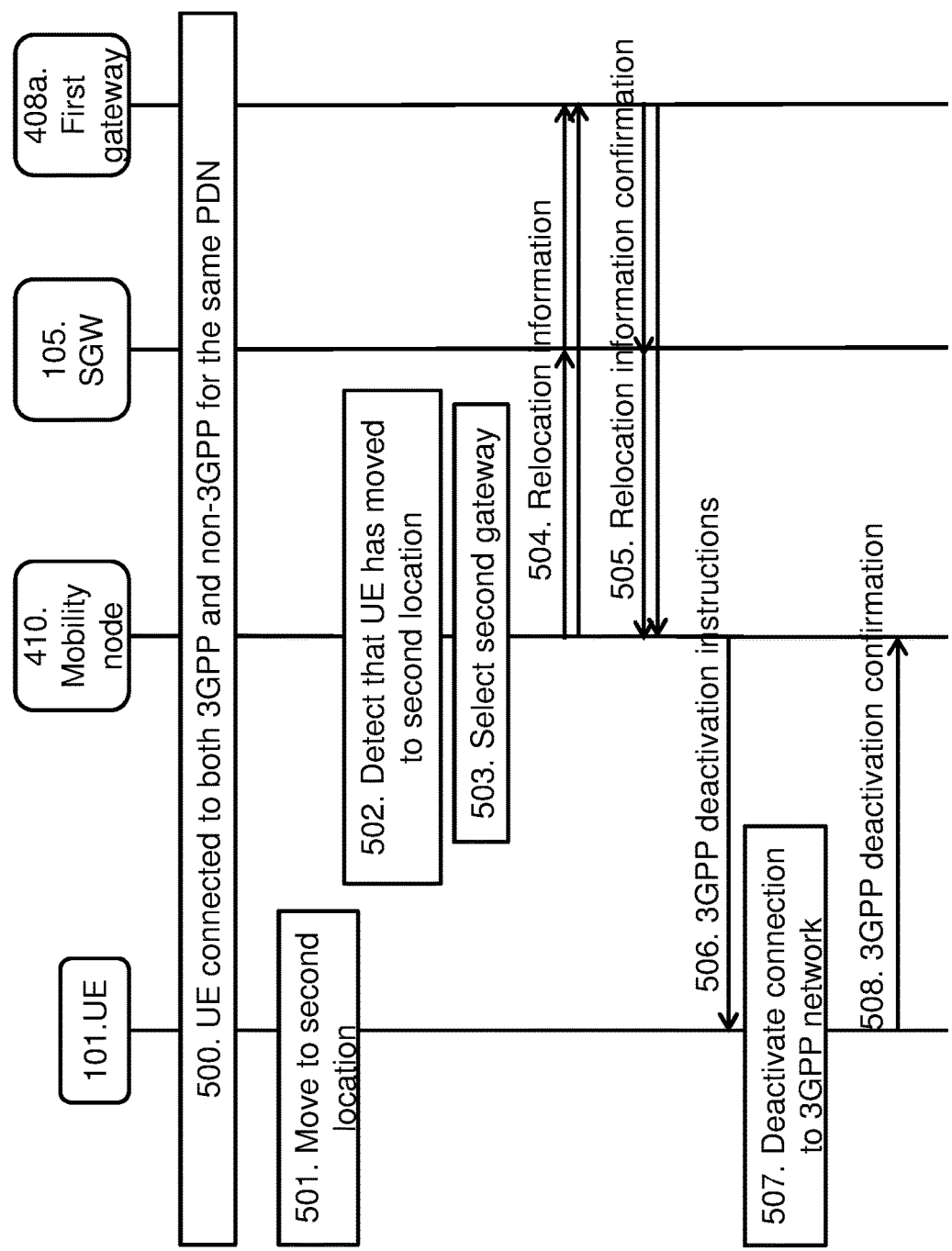
FIG. 5a-b are signaling diagrams illustrating embodiments of a method.
Figure 5B:
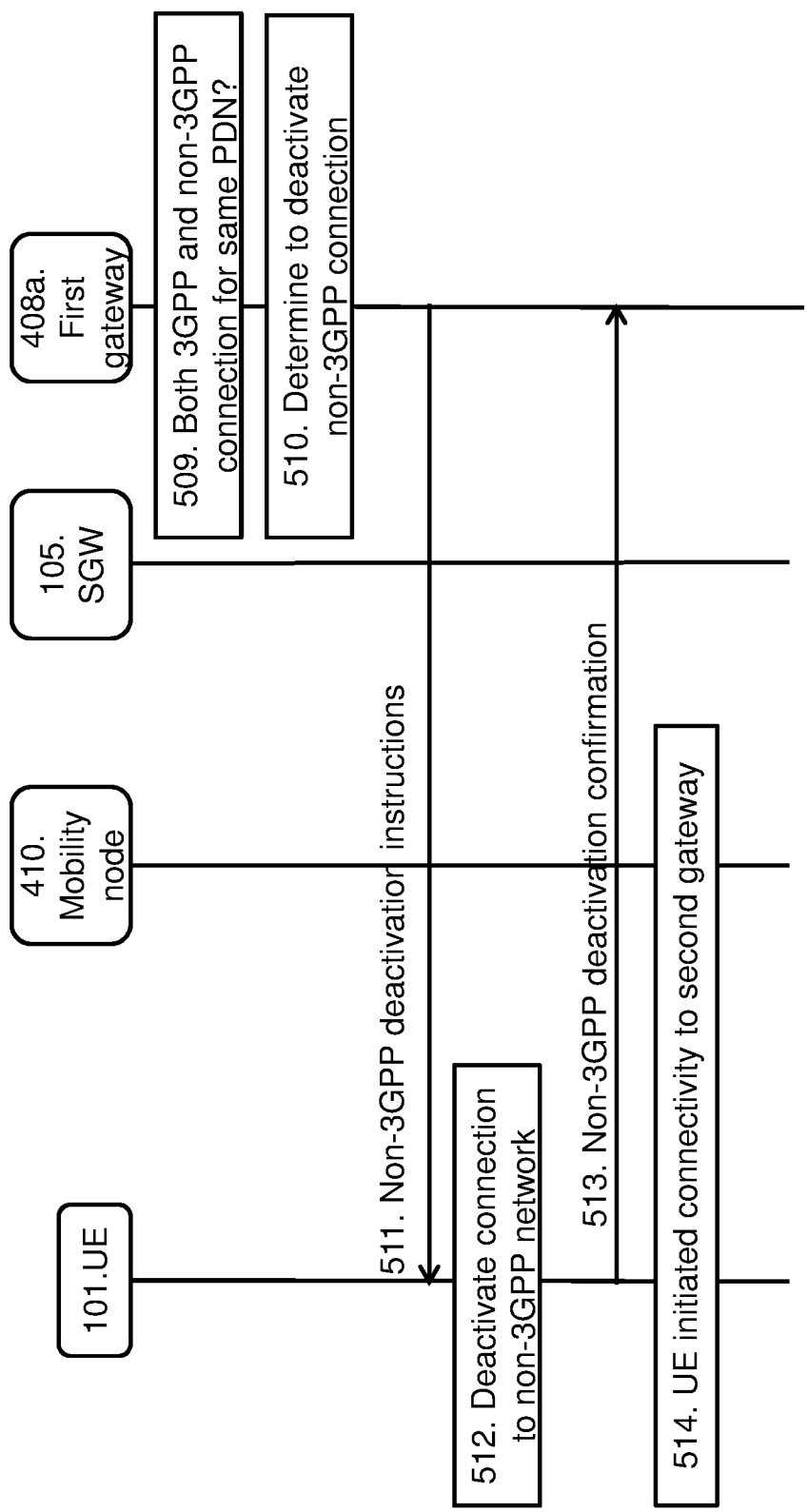

FIG. 5a and FIG. 5b are signaling diagrams illustrating an example of a method. FIG. 5b is a continuation of FIG. 5b. FIG. 5a comprises steps 500-508, and FIG. 5b comprises steps 509-514. Steps 500-508 should be performed before steps 509-514. The steps in the method in FIGS. 5a and 5b will now be described, starting with FIG. 5a. The method in FIG. 5a comprises at least some of the following steps, which steps may be performed in any suitable order than described below:

Step 500

This step is seen in FIG. 5a. The UE 101 is located at a first location and is connected to both the 3GPP network 401 and the non-3GPP network 115 for the same PDN. The first location may also be referred to as a current location. Using other words, the UE 101 has one PDN connection to the 3GPP network 401 and another PDN connection to the non-3GPP network 115. At the first location, the UE 101 is simultaneously connected to a first gateway 408a via a connection to the 3GPP network 401 and a connection to the non-3GPP network 115.

Step 501

This step is seen in FIG. 5a. The UE 101 moves from the first location to a second location. The second location may be referred to as another location.

Step 502

Figure 6:
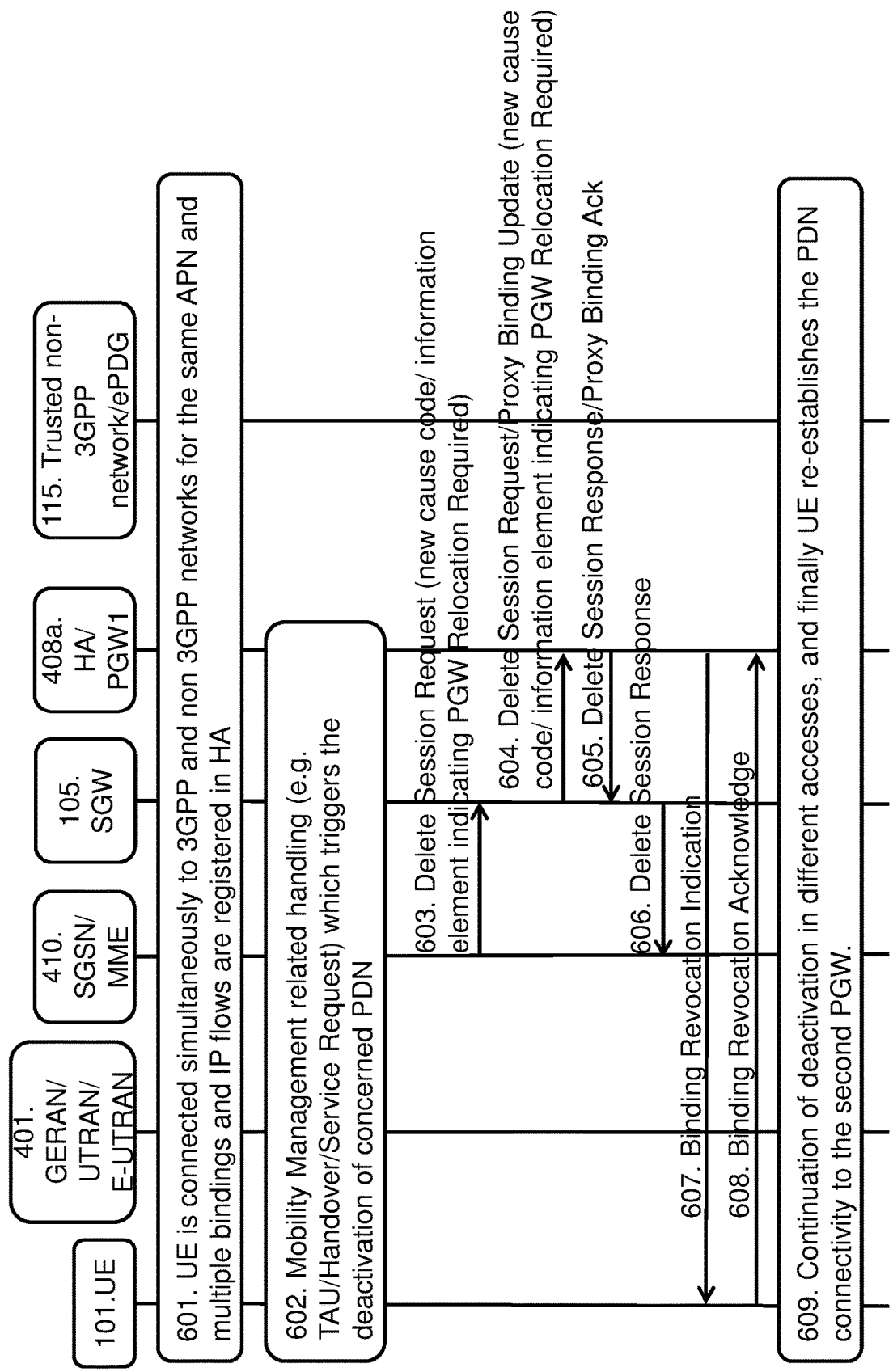
FIG. 6 is a signaling diagram illustrating embodiments of a method.
Figure 7:
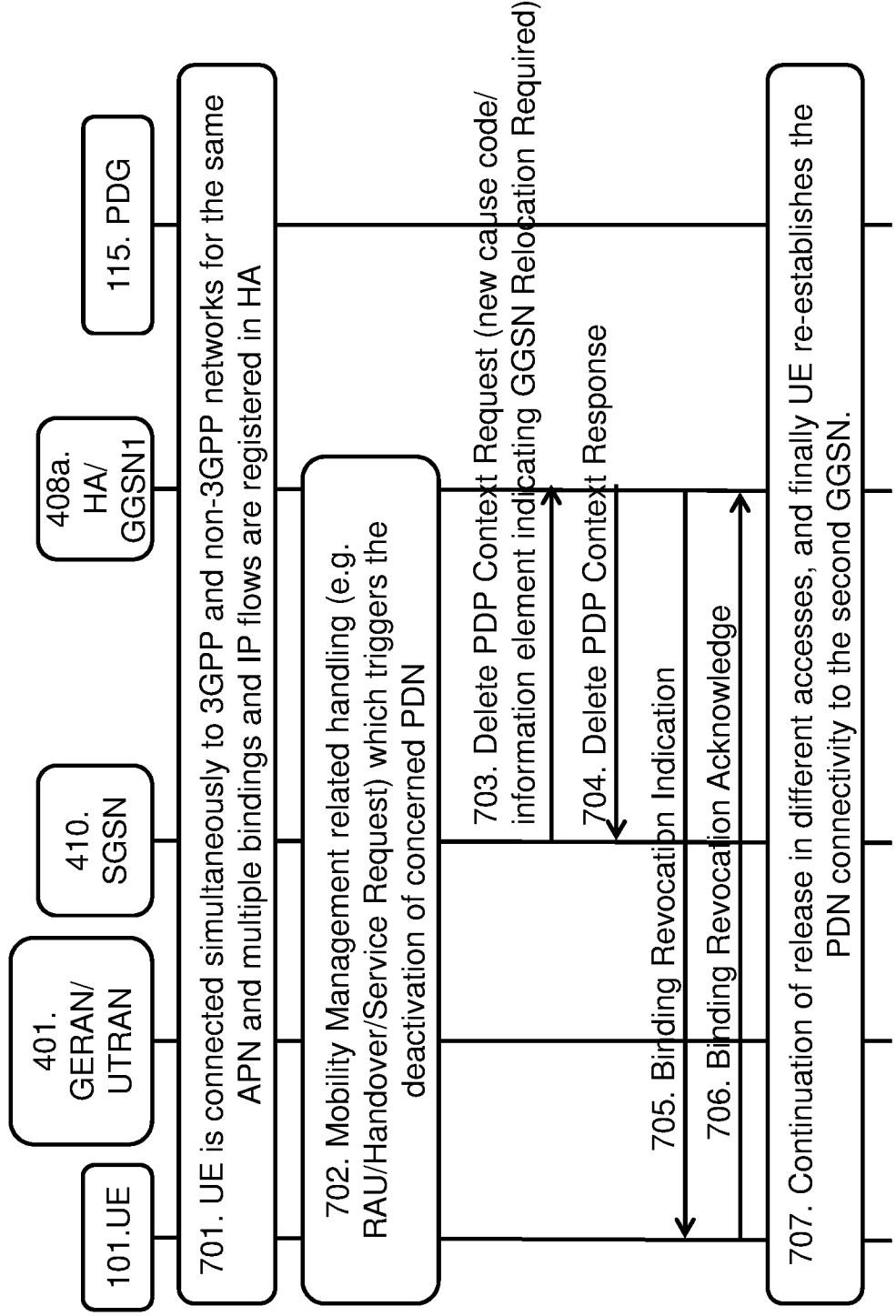
FIG. 7 is a signaling diagram illustrating embodiments of a method.

This step is seen in FIG. 5a. The mobility node 410 detects that the UE 101 has moved to the second location. The detection may be performed through e.g. a UE mobility management procedure such as a Tracking Area Update procedure or a handover procedure. Examples of such procedures are shown in FIGS. 6 and 7. This step may also involve that the UE 101 determines what the second location is, e.g. the geographical coordinates for the second location.

Step 503

This step is seen in FIG. 5a. Since the mobility node 410 detected in step 502 that the UE 101 has moved to a second location, the mobility node 410 determines that the UE 101 needs to be connected to a second gateway 408b, by selecting this second gateway 408b. This may also be referred to as a gateway relocation. The gateway relocation involves deactivation of network connections for the UE 101, e.g. connections to the 3GPP network 401 and to the non-3GPP network 115. The UE 101 should be connected to the second gateway 408b when it is at the second location. The reason for the selection of the second gateway 408b may be that the second gateway 408b is located geographically closer to the UE 101 at the second location.

The terms deletion and release may also be used when referring to deactivation of network connections herein.

The selection of the second gateway may be performed by a Domain Name Server (DNS) lookup in a DNS server, or by a search in a locally configured database of the mobility node, or by a query from other core network node (e.g. Policy and Charging Rules Function). The second gateway 408b may be selected from a plurality of candidate second gateways 408b. For example, in a plurality of candidate second gateways 408b, all gateways are all substantially closer to the UE 101 compared to the first gateway 408. The mobility node 410 may then select one of the candidate second gateways 408a which e.g. has available capacity for handling the UE 101, which has priority amongst the plurality of candidate second gateways 408b, or based on any other suitable parameter.

Step 504

This step is seen in FIG. 5a. The mobility node 410 transmits relocation information to the first gateway 408a, and the first gateway 408a receives the relocation information. The relocation information indicates that gateway relocation to the second gateway 408b is required for the UE 101.

The relocation information may be sent directly from the mobility node 410 to the first gateway 408a, or the relocation information may be sent via the SGW 105 or via a GGSN. The relocation information may be sent via the GGSN for example in a scenario where the first gateway 408a is a HA and the HA is not co-located with a GGSN.

Step 505

This step is seen in FIG. 5a. When the first gateway 408a has received the relocation information, it may transmit a confirmation of the received relocation information to the mobility node 410. The mobility node 410 receives the relocation information confirmation. The relocation information confirmation may be sent directly to the mobility node 410 or it may be sent via the SGW 105. A confirmation may also be referred to as an acknowledgement.

Step 506

This step is seen in FIG. 5a. When the mobility node 410 has selected the second gateway 408b, the mobility node 410 transmits 3GPP deactivation instructions (with reactivation indication) to the UE 101 to deactivate the UEs 101 connection to the 3GPP network 401. The UE 101 receives the 3GPP deactivation instructions. This step 506 may be performed directly after step 503, after step 504 or after step 505. The 3GPP deactivation instructions may comprise an identity of the connection to the 3GPP network 401 which should be deactivated. The connection may be a PDN connection.

Step 507

This step is seen in FIG. 5a. Based on the received 3GPP deactivation instructions, the UE 101 deactivates its connection to the 3GPP network 401.

Step 508

This step is seen in FIG. 5a. When the UE 101 has deactivated its connection to the 3GPP network 401, it may transmit a 3GPP deactivation confirmation to the mobility node 410 to confirm that it has deactivated its connection to the 3GPP network 401, as instructed. The mobility node 410 receives the transmitted 3GPP deactivation confirmation The method seen in FIG. 5b will now be described. The method in FIG. 5b comprises at least some of the following steps, which steps may be performed in any suitable order than described below:

Step 509

This step is seen in FIG. 5b. When the first gateway 408a has received the relocation information in step 504, the first gateway 408a may check if the UEs 101 connection to the 3GPP network 401 and the connection to the non-3GPP network 115 are for the same PDN. This step 509 may be performed after any of the steps 504-508.

Step 510

This step is seen in FIG. 5b. When the first gateway 408 determined in step 509 that the connection to the 3GPP network 401 and the connection to the non-3GPP network 115 is for the same PDN, the first gateway 408 determines to deactivate the UEs 101 connection to the non-3GPP network 115.

Step 511

This step is seen in FIG. 5b. Based on the decision in step 510, the first gateway 408a transmits non-3GPP deactivation instructions to the UE 101. The UE 101 receives the non-3GPP deactivation instructions. The non-3GPP deactivation instructions may comprise an identity of the connection to the non-3GPP network 115. The connection to the non-3GPP network 115 may be a PDN connection.

Step 512

This step is seen in FIG. 5b. The UE 101 deactivates the connection to the non-3GPP network 115, as instructed in step 511.

Step 513

This step is seen in FIG. 5b. When the UE 101 has deactivated its connection to the non-3GPP network 115, it may transmit a non-3GPP deactivation confirmation to the first gateway 408a. The first gateway 408a receives the non-3GPP deactivation confirmation. The non-3GPP deactivation confirmation confirms that the UE 101 has deactivated its connection to the non-3GPP network 115, as instructed in step 511. This step 513 may be performed directly after step 511 as confirmation of receiving the non-3GPP deactivation instructions.

Step 514

This step is seen in FIG. 5*b*. When the UE 101 has deactivated its connection to the non-3GPP network 115, the UE 101 initiates connectivity to second gateway 408*b*. Step 514 may be performed after step 512 or after step 513. When the UE 101 is re-connected to the 3GPP network 401 (the UE 101 was instructed that "reactivation/reattach required" in step 506), the standard gateway selection procedure is performed and the second gateway 408*b* (which is selected before deactivation) may be selected again (as soon as the UE 101 is not changing the location very frequently between the deactivation and reconnection).

FIG. 6 is a signaling diagram illustrating an example deactivation of connections in IFOM in an Evolved Packet System (EPS) mobility architecture. Recall that in IFOM, the UE 101 has data sessions with the same PDN simultaneously over the 3GPP network 401 and the non-3GPP network 115. The UE 101 can add or delete data sessions over either of the network accesses, effectively offloading data. The logic to offload data is more UE centric in IFOM (compared to LIPA and SIPTO) and is largely transparent to the RAN. In FIG. 6, the 3GPP network 401 is represented by a GERAN or a UTRAN or an E-UTRAN. The mobility node 410 is represented by a combined SGSN/MME node. The first gateway 408*a* is represented by a combined HA/PGW1 node, the second gateway 408*b* is represented by a combined HA/PGW2 node and the non-3GPP network 115 are represented by a trusted non-3GPP network or an ePDG. Table 2 below provides an overview of the example nodes in FIG. 6.

TABLE 2

| 401. 3GPP network | 115. non-3GPP network | 408a. First gateway | 408b. Second gateway | 410. Mobility node |
|---|---|---|---|---|
| GERAN UTRAN E-UTRAN | Trusted non-3GPP accesses ePDG | HA/PGW1 | HA/PGW2 | SGSN/MME |

The method in FIG. 6 comprises at least some of the following steps, which steps may be performed in any suitable order than described below:

Step 601

This step corresponds to step 500 in FIG. 5*a*. UE 101 is connected simultaneously to the 3GPP access 401 and the non-3GPP access 115 for the same APN. Multiple bindings and IP flows are registered in the HA part of the HA/PGW1 408. The UE 101 is connected to the HA/PGW1 408*a* which is geographically close to the UE 101. In other words, the UE 101 has established multiple PDN connections for the same APN (e.g. APN=internet) via different access simultaneously.

Step 602

This step corresponds to steps 501-503 in FIG. 5*a*. In this step, a mobility management related handling is performed which triggers the deactivation of the concerned PDN. Examples of the mobility management related handling may be a Tracking Area Update (TAU) or a Handover or a Service Request.

When the UE 101 moves its location in the PLMN, the SGSN/MME 410 detects the mobility related procedure (e.g. TAU). The SGSN/MME 410 determines to trigger the deactivation (with the possibility of reactivation) of the corresponding PDN connection, in order to select a new PGW2 408*b* which is topologically and geographically closer to the UE 101 than the previous HA/PGW1 408*a*, based on certain input. The input used by the SGSN/MME 410 in the selection of the new PGW2 408*b* may be for example e.g. Tracking Area Identity (TAI), base station ID, E-UTRAN-Cell Global Identifier. (E-CGI), QoS Class Identifier (QCI), Address Resolution Protocol (ARP), Guaranteed Bit Rate (GBR), Maximum Bit Rate (MBR), International Mobile Equipment Identity (IMEI), etc.

Step 603

This step corresponds to step 504 in FIG. 5*a*. The SGSN/MME 410 transmits a Delete Session Request message to the SGW 105, and the SGW 105 receives the message.

The delete session request message comprises an indication of the need for PGW relocation, i.e. the relocation information. The indication may be in the form of a Cause Code (CC) or an Information Element (IE) indicating PGW Relocation Required. In other words, the SGSN/MME 410 notifies the SGW 105 with such event by including a new indication or new cause code indicating "PGW Relocation Required" in Delete Session Request message. The Delete Session Request message may be referred to as a GTP Delete Session Request message.

Step 604

This step corresponds to step 504 in FIG. 5*a*. The SGW 105 forwards the Delete Session Request message from step 603 to the HA/PGW1 408*a* which the UE 101 has moved away from, or the SGW 105 transmits a Proxy Binding Update message to the HA/PGW1 408*a*. The HA/PGW1 408*a* receives the Delete Session Request message or the Proxy Binding Update message. The Delete Session Request message or the Proxy Binding Update message comprises the new cause code or information element indicating that the PGW relocation is required. In other words, the SGSN/MME 410 notifies the HA/PGW1 408*a* with such event by including a new indication or new cause code indicating "PGW Relocation Required" in the Delete Session Request message or the Proxy Binding Update message.

Step 605

This step corresponds to step 505 in FIG. 5*a*. If the transmitted message in step 604 was a Delete Session Request message, the HA/PGW1 408*a* may transmit a Delete Session Response message to the SGW 105. If the transmitted message in step 604 was a Proxy Binding Update message, the HA/PGW1 408*a* may transmit a Proxy Binding Acknowledgement message to the SGW 105. The message sent in step 605 is a response to the message in step 604. The SGW 105 receives the Delete Session Response message or the Proxy Binding Acknowledgement message.

Step 606

This step corresponds to step 505 in FIG. 5*a*. The SGW 105 may transmit a Delete Session response message to the SGSN/MME 410. The SGSN/MME 410 receives the Delete Session Response message. The message in step 606 is a response to the message in step 603.

Step 607

This step corresponds to step 511 in FIG. 5*b*. The HA/PGW1 408*a* deactivates the PDN connection to the non-3GPP network 115 of the UE 101 by transmitting a Binding Revocation Indication message to the UE 101. The UE 101 receives the Binding Revocation Indication message and deactivates the connection to the non-3GPP network 115.

Step 608

This step corresponds to step 513 in FIG. 5*b*. The UE 101 may transmit a Binding Revocation Acknowledge message to the HA/PGW1 408*a*. The HA/PGW1 408*a* receives the Binding Revocation Acknowledge message. The Binding Revocation Acknowledge message is a response to the Binding Revocation Indication message in step 607 which indicates that the Binding Revocation Indication message has been received. It may also indicate that the connection to the non-3GPP network 115 has been successfully deactivated.

Note that in case of a PMIP based S5/S8 interface between the SGW 105 and the PGW 108, the same modification may apply for PMIP Proxy Binding Update with a vendor specific extension.

Step 609

The core network continues to deactivate resources in different access. The UE 101 may re-establish the PDN connection to the 3GPP network 401 using another PGW2 408*b* (and possibly with addition of a connection to the non-3GPP network 115) after receiving a reactivation indication from the mobility node 410. In other words, step 609 relates to the continuation of release in different access, and finally the UE 101 may be told to re-establish the PDN connectivity to the 3GPP network 401 (and possibly also to the non-3GPP network 115).

It is possible that the UE 101 may reactivate the connection to non-3GPP network 115, after the previous connection has been deactivate.

When deactivating resources in the different access, it is all occupied resources in different entities used for the particular PDN connection that are deactivated. The resources may therefore be referred to as a PDN connection.

Step 609 is when the non-3gpp access release is delayed. At step 607, the UE 101 does not immediately deactivate the connection to the non-3GPP network 115, but returns a confirmation of the reception of deactivation indication (step 608) first.

FIG. 7 is a signaling diagram illustrating an example of deactivation of connections in IFOM in a GPRS I-WLAN mobility architecture. I-WLAN is short for Interworking-Wireless Local Area Network. Recall that in IFOM, the UE 101 has data sessions with the same PDN simultaneously over the 3GPP network 401 and the non-3GPP network 115. In FIG. 7, the 3GPP network 401 is represented by a GERAN or a UTRAN. The mobility node 410 is represented by a SGSN. The first gateway 408*a* is represented by a combined HA/GGSN1 node, the second gateway 408*b* is represented by a HA/GGSN2, and the non-3GPP network 115 is represented by a Packet Data Gateway (PDG).

Table 3 below provides an overview of the example nodes in FIG. 7.

TABLE 3

| 401. 3GPP network | 115. non-3GPP network | 408a. First gateway | 408b. Second gateway | 410. Mobility node |
|---|---|---|---|---|
| GERAN UTRAN | PDG | HA/GGSN1 | HA/GGSN2 | SGSN |

The method in FIG. 7 comprises at least some of the following steps, which steps may be performed in any suitable order than described below:

Step 701

This step corresponds to step 500 in FIG. 5*a* and step 601 in FIG. 6. UE 101 is connected simultaneously to the 3GPP access 401 (e.g. the GERAN or UTRAN) and the non-3GPP access 115 for the same APN. Multiple bindings and IP flows are registered in the HA part of the HA/PGW1 408. The UE 101 is connected to the HA/GGSN1 408*a* which is geographically close to the UE 101. In other words, the UE 101 has established multiple PDN connections for the same APN (e.g. APN=internet) via different access simultaneously.

Step 702

This step corresponds to steps 501-503 in FIG. 5*a* and step 602 in FIG. 6. In this step, a mobility management related handling is performed which triggers the deactivation of the concerned PDN. Examples of the mobility management related handling may be a Routing Area Update (RAU) or a Handover or a Service Request.

When the UE 101 moves its location in the PLMN, the SGSN 410 detects the mobility related procedure (e.g. RAU). The SGSN 410 determines to trigger the deactivation (with the possibility of reactivation) of the corresponding PDN connection, in order to select a new GGSN2 408*b* which is topologically and geographically closer to the UE 101 than the previous HA/GGSN 408*a*, based on certain input. The input used by the SGSN 410 in the selection of the new GGSN 408*b* may be for example e.g. Routing Area Identity (RAI), base station ID, E-CGI, ARP, GBR, MBR, IMEI, etc.

Step 703

This step corresponds to step 504 in FIG. 5*a* and step 603-604 in FIG. 6. The SGSN 410 transmits a Delete Packet Data Protocol (PDP) Context Request message to the HA/GGSN1 408*a*. The HA/GGSN1 408*a* receives the Delete PDP Context Request message.

The Delete PDP Context Request message comprises an indication of the need for GGSN relocation, i.e. the relocation information. The indication may be in the form of a CC or an IE indicating GGSN Relocation Required. In other words, the SGSN 410 notifies the HA/GGSN1 408*a* with such event by including a new indication or new cause code indicating "GGSN Relocation Required" in the Delete PDP Context Request message.

Step 704

This step corresponds to step 505 in FIG. 5*a* and to step 605-606 in FIG. 6. The HA/GGSN1 408*a* may transmit a Delete PDP Context Response message to the SGSN 410. The Delete PDP Context Response message is received by the SGSN 410. The Delete PDP Context Response message is a response to the Delete PDP Context Request message in step 703.

Step 705

This step corresponds to step 511 in FIG. 5*b* and step 607 in FIG. 6. The HA/GGSN1 408*a* deactivates the PDN connection to the non-3GPP network 115 of the UE 101 by transmitting a Binding Revocation Indication message to the UE 101. The UE 101 receives the Binding Revocation Indication message and deactivates the connection to the non-3GPP network 115.

Step 706

This step corresponds to step 513 in FIG. 5*b* and step 608 in FIG. 6. The UE 101 may transmit a Binding Revocation Acknowledge message to the HA/GGSN1 408*a*. The HA/GGSN1 408*a* receives the Binding Revocation Acknowledge message. The Binding Revocation Acknowledge message is a response to the Binding Revocation Indication message in step 705 which indicates that the Binding Revocation Indication message has been received.

It may also indicate that the connection to the non-3GPP network 115 has been successfully deactivated.

Step 707

This step corresponds to step 609 in FIG. 6. The core network continues to deactivate resources in different access. The UE 101 may re-establish the PDN connection to the 3GPP network 401 using the other GGSN2 408b (and possibly with addition of a connection to the non-3GPP network 115) after receiving a reactivation indication from the mobility node 410. In other words, step 707 relates to the continuation of release in different access, and finally the UE 101 may be told to re-establish the PDN connectivity to the 3GPP network 401 (and possibly also to the non-3GPP network 115).

Figure 8:
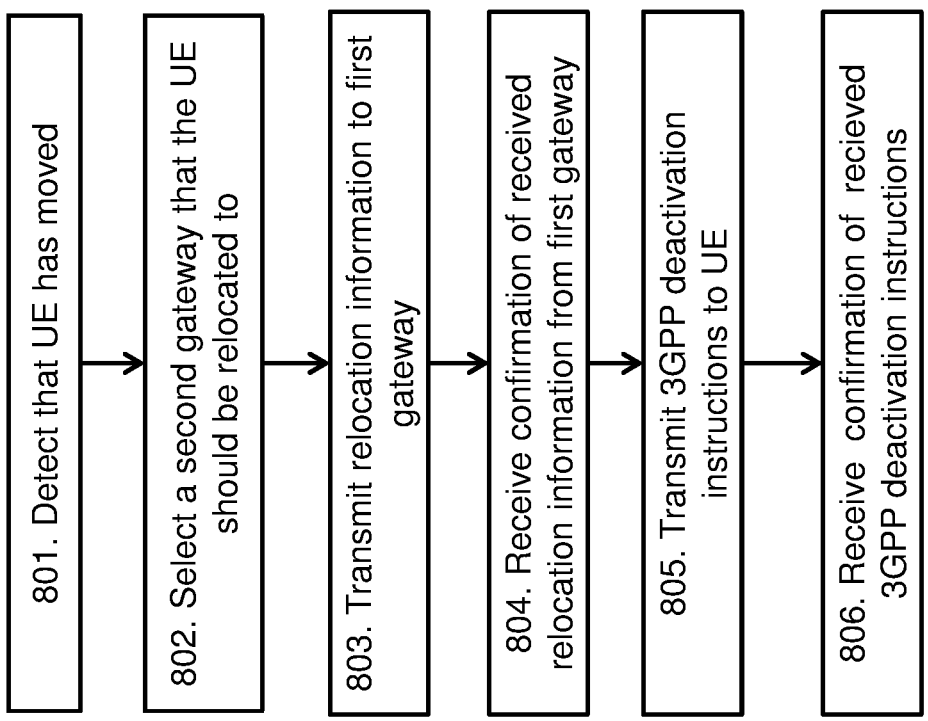
FIG. 8 is a flow chart illustrating embodiments of a method performed by the mobility node.

The method described above will now be described seen from the perspective of the mobility node 410. FIG. 8 is a flowchart describing the present method performed by the mobility node 410, for handling network connections for the UE 101. The UE 101 is simultaneously connected to the first gateway 408a via a connection to a 3GPP network 401 and a connection to a non-3GPP network 115. Before the method in FIG. 8 starts, the mobility node 410 has established a connection to the 3GPP network 401 and a connection to the non-3GPP network 115 for the UE 101. The UE 101 and the first gateway 408a may support IFOM or NB-IFOM. For example, the UE 101 may use Protocol Configuration Option (PCO) procedure to indicate IFOM or NB-IFOM support. The first gateway 408a supporting IFOM or NB-IFOM may use PCO procedure to confirm the IFOM or NB-IFOM support. If the first gateway 408a does not support IFOM or NB-IFOM, the UE 101 may disable IFOM or NB-IFOM capabilities for that PDN connection.

The mobility node 410 may be a MME, or a SGSN, or a combined MME and SGSN node.

The method in FIG. 8 comprises at least some of the following steps to be performed by the mobility node 410, which steps may be performed in any other suitable order than described below:

Step 801

This step corresponds to step 502 in FIG. 5a, step 602 in FIG. 6 and step 702 in FIG. 7. The mobility node 410 detects that the UE 101 has moved to another location. For example, the UE 101 moves from a first location to a second location. Since the mobility node 410 detects that the UE 101 has moved, the mobility node 410 needs to perform mobility management for the UE 101.

Step 802

This step corresponds to step 503 in FIG. 5a, step 602 in FIG. 6 and step 702 in FIG. 7. When it is detected that the UE 101 has moved to another location, the mobility node 410 selects a second gateway 408b that the UE 101 should be relocated to, and determines to relocate the UE 101 to the selected second gateway 408b. The second gateway 408b is closer to the UE 101 at the other location to which it has moved, e.g. the second gateway 408 is closer at the second location compared to at the first location. The relocation of the UE 101 to the second gateway 408b may also be described as relocating the network connections of the UE 101 to the second gateway 408b.

Step 803

This step corresponds to step 504 in FIG. 5a, step 603 and step 604 in FIG. 6 and step 703 in FIG. 7. The mobility node 410 transmits relocation information to the first gateway 408a. The relocation information indicates that a gateway relocation to the second gateway 408b is required for the UE 101. The gateway relocation involves deactivation of both the connection to the 3GPP network 401 and the connection to the non-3GPP network 115.

The relocation information may be transmitted to the first gateway 408a via the SGW 105 (in an EPS system) or via a GGSN (in a GPRS I-WLAN system).

The relocation information may be comprised in a GTP Delete Session Request message between the mobility node 410 and a SGW 105, and in a GTP Delete Session Request message or a Proxy Binding Update message between the SGW 105 and the first gateway 408a. Or, the relocation information may be comprised in a Delete PDP Context Request between the mobility node 410 and the first gateway 408a (when not transmitted via the SGW 105).

The relocation information may be an IE or a CC.

The deactivation of the connection to the 3GPP network 401 may require reactivation of the connection to the 3GPP network 401 at a later step.

Step 804

This step corresponds to step 505 in FIG. 5a, step 605 and step 606 in FIG. 6 and step 704 in FIG. 7. The mobility node 410 may receive, from the first gateway 408a, a confirmation of that the relocation information has been received. The confirmation may be referred to as a relocation information confirmation.

The confirmation of that the relocation information has been received may be received from the first gateway 408a via the SGW 105 in an EPS system or via the GGSN in a GPRS I-WLAN system.

The confirmation of that the relocation information has been received may be received in a GTP Delete Session Response message or in a PMIPv6 Proxy Binding Acknowledgement message between the SGW 105 and the first gateway 408a and in a GTP Delete Session Response message between the SGW 105 and the mobility node 410. Or, the confirmation of that the relocation information has been received may be received in a Delete PDP Context Response message between the first gateway 408a and the mobility node 410 (when not transmitted via the SGW 105).

Step 805

This step corresponds to step 506 in FIG. 5a. The mobility node 410 may transmit, to the UE 101, 3GPP deactivation instructions to deactivate the connection to the 3GPP network 401.

The UEs 101 connection to the non-3GPP network 115 may be deactivated with a DSMIPv6 release procedure. An IP address of the UE 101 may be used as a Home of Address (HoA) for the DSMIPv6 release procedure. The IP address may allocate to the UE 101 by the first gateway 408a.

IFOM requires that both the 101 UE and first gateway 408a support DSMIPv6. The dual-stack version of MIPv6 may be referred to as DSMIPv6 and is specified in RFC 5555. It is an extension of MIPv6, and it adds the support for IPv4 network and allows a dual stack UE to achieve mobility between an IPv4 network and an IPv6 network for continuity of the communication.

Step 806

This step corresponds to step 508 in FIG. 5a. The mobility node 410 may receive, from the UE 101, a confirmation of the received 3GPP deactivation instruction. The confirmation may be referred to as 3GPP deactivation confirmation.

Figure 9:
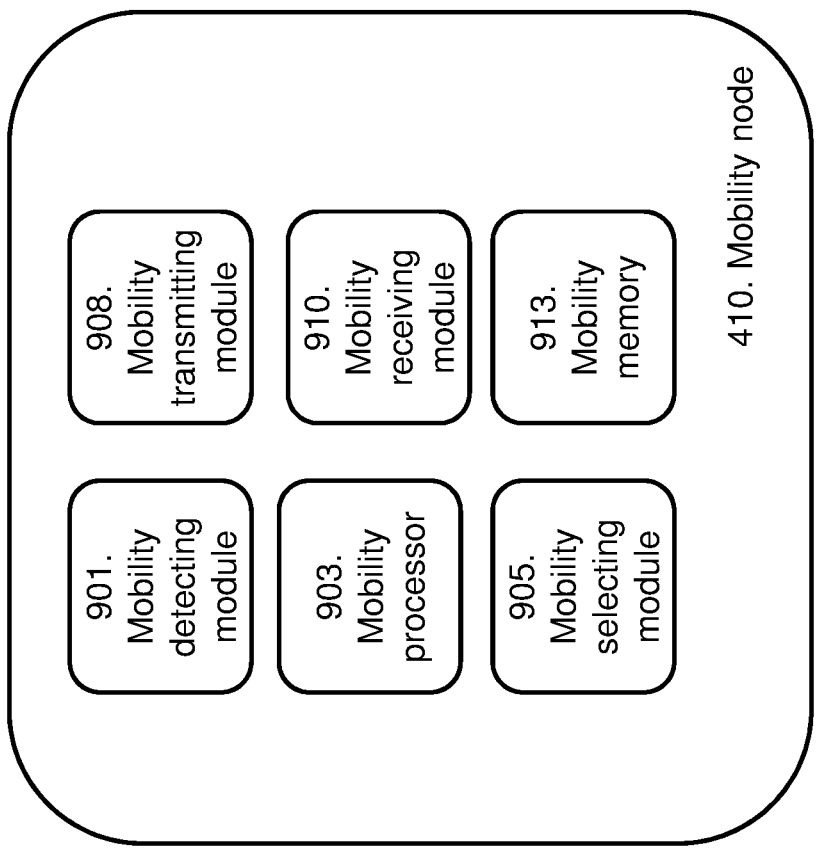
FIG. 9 is a schematic block diagram illustrating embodiments of the mobility node.

To perform the method steps shown in FIGS. 5a, 5b, 6, 7 and 8 for handling network connections for a UE 101, the mobility node 410 may comprise an arrangement as shown in FIG. 9. The UE 101 is simultaneously connected to a first gateway 408a via a connection to a 3GP network 401 and a connection to a non-3GPP network 115. The UE 101 and the first gateway 408a may support IFOM or NB-IFOM. The mobility node 410 may be a, MME or a SGSN or a combined MME and SGSN node.

To perform the method steps shown in FIG. 8 for handling network connections for a UE 101, the mobility node 410 is adapted to, e.g. by means of a mobility detecting module 901, detect that the UE 101 has moved to another location. The mobility detecting module 901 may also be referred to as a mobility detecting unit, a mobility detecting means, a mobility detecting circuit, mobility means for detecting etc. The mobility detecting module 901 may be a mobility processor 903 of the mobility node 410.

The mobility node 410 is adapted to, e.g. by means of a mobility selecting module 905, when it is detected that the UE 101 has moved to another location, select a second gateway 408b that the UE 101 should be relocated to. The second gateway 408b is closer to the UE 101 at the other location. The mobility selecting module 905 may also be referred to as a mobility selecting unit, a mobility selecting means, a mobility selecting circuit, mobility means for selecting etc. The mobility selecting module 905 may be the mobility processor 903 of the mobility node 410.

The mobility node 410 is adapted to, e.g. by means of a mobility transmitting module 908, transmit relocation information to the first gateway 408a. The relocation information indicates that a gateway relocation to the second gateway 408b is required for the UE 101. The gateway relocation involves deactivation of both the connection to the 3GPP network 401 and the connection to the non-3GPP network 115. The UEs 101 connection to the non-3GPP network 115 may be deactivated with a DSMIPv6 release procedure. An IP address of the UE 101 may be used as a HoA for the DSMIPv6 release procedure. The IP address may be allocated to the UE 101 by the first gateway 408a. The relocation information may be comprised in an IE or a CC. The deactivation may require reactivation of the connection to the 3GPP network 401. The relocation information may be transmitted to the first gateway 408a via a SGW 105 or via a GGSN. The relocation information may be comprised in a GTP Delete Session Request message between the mobility node 410 and a SGW 105, and in a GTP Delete Session Request message or a Proxy Binding Update message between the SGW 105 and the first gateway 408a. Or, the relocation information may be comprised in a Delete PDP Context Request between the mobility node 410 and the first gateway 408a. The mobility transmitting module 908 may also be referred to as a mobility transmitting unit, a mobility transmitting means, a mobility transmitting circuit, mobility means for transmitting, mobility output unit etc. The mobility transmitting module 908 may be a transmitter, a transceiver etc. The mobility transmitting module 908 may be a wireless transmitter of the mobility node 410 of a wireless or fixed communications system.

The mobility node 410 may be further adapted to, e.g. by means of the mobility transmitting module 908, transmit, to the UE 101, 3GPP deactivation instructions to deactivate the connection to the 3GPP network 401.

The mobility node may be further adapted to, e.g. by means of a mobility receiving module 910 receive, from the UE 101, a confirmation of the received 3GPP deactivation instruction. The confirmation of that the relocation information has been received may be received from the first gateway 408a via a SGW 105 or via a GGSN. The confirmation of that the relocation information has been received may be received in a GTP Delete Session Response message or a PMIPv6 Proxy Binding Acknowledgement message between a SGW 105 and the first gateway 408a, and in a GTP Delete Session Response message between the SGW 105 and the mobility node 410. Or, the confirmation of that the relocation information has been received is received in a Delete PDP Context Response message between the first gateway 408a and the mobility node 410. The mobility receiving module 910 may also be referred to as a mobility receiving unit, a mobility receiving means, a mobility receiving circuit, mobility means for receiving, input unit etc. The mobility receiving module 910 may be a receiver, a transceiver etc. The mobility receiving module 910 may be a wireless receiver of the mobility node 410 of a wireless or fixed communications system.

The mobility node 410 may be further adapted to, e.g. by means of the mobility receiving module 910, receive, from the first gateway 408a, a confirmation of that the relocation information has been received.

The mobility node 410 may comprise a mobility memory 913. The mobility memory 913 comprises instructions executable by the mobility processor 903.

The mobility memory 913 comprises one or more memory units. The mobility memory 913 is arranged to be used to store data, received data streams, power level measurements, relocation information, instructions, confirmations, location information, information about connections, IEs, CCs, threshold values, time periods, configurations, schedulings, and applications to perform the methods herein when being executed in the mobility node 410.

Those skilled in the art will also appreciate that the mobility detecting module 901, the mobility selecting module 905, the mobility transmitting module 908 and the mobility receiving module 910, described above may refer to a combination of analog and digital circuits, and/or one or more processors configured with software and/or firmware, e.g. stored in a memory, that when executed by the one or more processors such as the mobility processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a mobility computer program may comprise instructions which, when executed on at least one processor (e.g. the mobility processor 903), cause the at least one processor to carry out the method steps 801-806 in FIG. 8. A mobility carrier may comprise the mobility computer program, and the mobility carrier is one of an electronic signal, optical signal, radio signal or computer readable storage medium.

Figure 10:
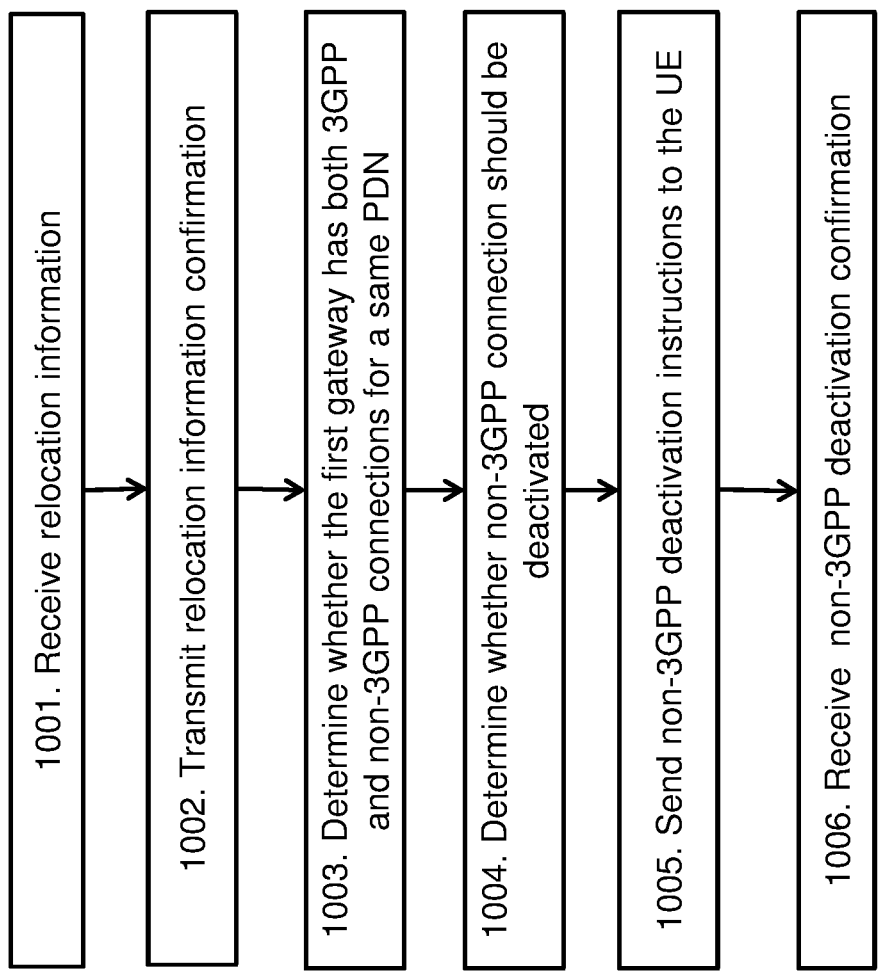
FIG. 10 is a flow chart illustrating embodiments of a method performed by the first gateway.

The method described above will now be described seen from the perspective of the first gateway 408a. FIG. 10 is a flowchart describing the present method performed by the first gateway 408a, for handling network connections for the UE 101. The UE 101 is simultaneously connected to the first gateway 408a via a connection to a 3GPP network 401 and a connection to a non-3GPP network 115. The method in FIG. 10 comprises at least some of the following steps to be performed by the first gateway 408a, which steps may be performed in any other suitable order than described below:

Step 1001

This step corresponds to step 504 in FIG. 5a, step 603 and step 604 in FIG. 6 and step 703 in FIG. 7. The first gateway 408a receives relocation information from the mobility node 410. The relocation information indicates that a gateway relocation to a second gateway 408b is required for the UE 101.

The relocation information may be received from the mobility node 410 via SGW 105 (e.g. in an EPS system) or via a GGSN (e.g. in a GPRS I-WLAN system).

The relocation information may be comprised in a GTP Delete Session Request message between the mobility node 410 and a SGW 105 and in a GTP Delete Session Request message or a PMIPv6 Proxy Binding Update message between the SGW 105 and the first gateway 408a. Or, the relocation information may be comprised in a Delete PDP Context Request between the mobility node 410 and the first gateway 408a.

The relocation information may be an IE or a CC.

Step 1002

This step corresponds to step 505 in FIG. 5a, step 605 and step 606 in FIG. 6 and step 704 in FIG. 7. The first gateway node 408a may transmit, to the mobility node 410, a relocation information confirmation of that the relocation information has been received.

The confirmation of that the relocation information has been received may be transmitted to the mobility node 410 via a SGW 105 or via a GGSN.

The confirmation of that the relocation information has been received may be transmitted in a Delete Session Response message or a Proxy Binding Acknowledgement message between the first gateway 408a and a SGW 105, and in a Delete Session Response message between the SGW 105 and the mobility node 410. Or, the confirmation of that the relocation information has been received is transmitted in a Delete PDP Context Response message between the first gateway 408a and the mobility node 410.

Step 1003

This step corresponds to step 509 in FIG. 5b. The first gateway 408a determines whether the first gateway 408a has both 3GPP and non-3GPP connections for the same PDN.

Before the first gateway 408a determines whether it has both 3GPP and non-3GPP connections for the same PDN, the first gateway 408a may check whether the HoA is released. If the HoA is released, then the first gateway 408a determines whether it has both 3GPP and non-3GPP connections for the same PDN, e.g. for the released HoA. If the HoA is not released, i.e. only the Care of Address (CoA) is released, the first gateway 408a (e.g. the GGSN) shall not trigger the deactivation of the connection towards the non-3GPP network 115, since the 3GPP network 401 is used as a foreign link in this case and it is allowed to change the gateway 408 while keeping the HoA in the non-3GPP network 115.

But in some cases, the 3GPP network 401 may be the home link (especially the 3GPP mandates such for HA/PGW collocated case in EPC network), so here such check may be omitted by the gateway 408 since it already knows that the HoA is released by receiving the release message from the SGSN/MME 410, if 3GPP network 401 is the home link.

Step 1004

This step corresponds to step 510 in FIG. 5b. When the first gateway 408a has both 3GPP and non-3GPP connections, the first gateway 408a determines, based on the received relocation information, whether the connection to the non-3GPP network 115 should be deactivated.

Step 1005

This step corresponds to step 511 in FIG. 5b, step 607 in FIG. 6 and step 705 in FIG. 7. The first gateway 408a transmits non-3GPP deactivation instructions to the UE 101 to deactivate its connection to the non-3GPP network 115. The non-3GPP deactivation instructions may be sent in a binding revocation indication message.

Step 1006

This step corresponds to step 513 in FIG. 5b, step 608 in FIG. 6 and step 706 in FIG. 7. The first gateway 408a may receive, from the UE 101, a non-3GPP deactivation confirmation of that the connection to the non-3GPP network 115 has been deactivated. It may also be described as a confirmation of that the non-3GPP deactivation instructions have been received by the UE 101. The non-3GPP deactivation confirmation may be received in a binding revocation acknowledge message.

Figure 11:
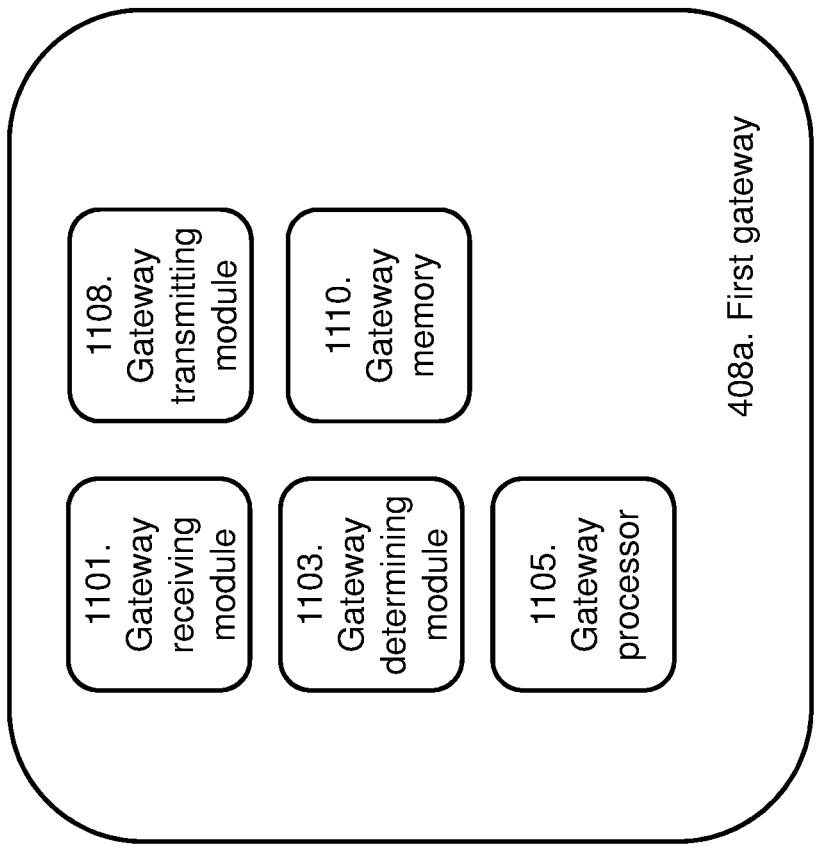
FIG. 11 is a schematic block diagram illustrating embodiments of the first gateway.

To perform the method steps shown in FIGS. 5a, 5b, 6, 7 and 10 for handling network connections for a UE 101, the first gateway 408a may comprise an example arrangement as shown in FIG. 11. The UE 101 is simultaneously connected to a first gateway 408a via a connection to a 3GP network 401 and a connection to a non-3GPP network 115. The UE 101 and the first gateway 408a may support IFOM or NB-IFOM. The first gateway 408a may be a standalone HA, a combined HA and PGW, or a combined HA and GGSN.

To perform the method steps shown in FIG. 8 for handling network connections for a UE 101, the first gateway 408a is adapted to, e.g. by means of a gateway receiving module 1101, receive relocation information from a mobility node 410. The relocation information indicates that a gateway relocation to a second gateway 408b is required for the UE 101. The relocation information may be received from the mobility node 410 via a SGW 105 or via a GGSN. The relocation information may be comprised in a GTP Delete Session Request message between the mobility node 410 and a SGW 105 and in a GTP Delete Session Request message or a PMIPv6 Proxy Binding Update message between the SGW 105 and the first gateway 408a. Or, the relocation information is comprised in a Delete PDP Context Request between the mobility node 410 and the first gateway 408a. The relocation information may be an IE or a CC. The gateway receiving module 1101 may also be referred to as a gateway receiving unit, a gateway receiving means, a gateway receiving circuit, gateway means for receiving, gateway input unit etc. The gateway receiving module 1101 may be a receiver, a transceiver etc. The gateway receiving module 1101 may be a wireless receiver of the first gateway 408a of a wireless or fixed communications system.

The first gateway 408a is adapted to, e.g. by means of a gateway determining module 1103, determine whether the first gateway 408a has both 3GPP and non-3GPP connections for the same PDN. The gateway determining module 1103 may also be referred to as a gateway determining unit, a gateway determining means, a gateway determining circuit, gateway means for determining etc. The gateway determining module 1103 may be a gateway processor 1105 of the first gateway 408a.

The first gateway 408a is adapted to, e.g. by means of the gateway determining module 1103, when the first gateway 408a has both 3GPP and non-3GPP connections, determine, based on the received relocation information, whether the connection to the non-3GPP network 115 should be deactivated.

The first gateway node 408a is adapted to, e.g. by means of a gateway transmitting module 1108, transmit non-3GPP deactivation instructions to the UE 101 to deactivate its connection to the non-3GPP network 115. The non-3GPP deactivation instructions may be sent in a binding revocation indication message. The UEs 101 connection to the non-3GPP network 115 may be deactivated with a DSMIPv6 release procedure. An IP address of the UE 101 may be used as a HoA for the DSMIPv6 release procedure. The IP address may be allocated to the UE 101 by the first gateway 408a. The gateway transmitting module 1108 may also be referred to as a gateway transmitting unit, a gateway transmitting means, a gateway transmitting circuit, gateway means for transmitting, gateway output unit etc. The gateway transmitting module 1108 may be a transmitter, a transceiver etc. The gateway transmitting module 1108 may be a wireless transmitter of the first gateway 408a of a wireless or fixed communications system.

The first gateway 408a may be further adapted to, e.g. by means of the gateway transmitting module 1108, transmit, to the mobility node 410, a relocation information confirmation of that the relocation information has been received. The relocation information confirmation may be transmitted to the mobility node 410 via a SGW 105 or via a GGSN. The relocation information confirmation may be transmitted in a Delete Session Response message or a Proxy Binding Acknowledgement message between the first gateway 408a and a SGW 105, and in a Delete Session Response message between the SGW 105 and the mobility node 410. Or, the relocation information confirmation may be transmitted in a Delete PDP Context Response message between the first gateway 408a and the mobility node 410.

The first gateway 408a may be further adapted to, e.g. by means of the gateway receiving module 1101, receive, from the UE 101, a non-3GPP deactivation confirmation of that the connection to the non-3GPP network 115 has been deactivated. The non-3GPP deactivation confirmation may be received in a binding revocation acknowledge message.

The first gateway 408a may comprise a gateway memory 1110. The gateway memory 1110 comprises instructions executable by the gateway processor 1105. The gateway memory 1105 comprises one or more memory units. The gateway memory 1105 is arranged to be used to store data, received data streams, power level measurements, relocation information, instructions, confirmations, location information, information about connections, IEs, CCs, threshold values, time periods, configurations, schedulings, and applications to perform the methods herein when being executed in the first gateway 408a.

Those skilled in the art will also appreciate that the gateway receiving module 1101, the gateway determining module 1103 and the gateway transmitting module 1108, described above may refer to a combination of analog and digital circuits, and/or one or more processors configured with software and/or firmware, e.g. stored in a memory, that when executed by the one or more processors such as the gateway processor 1105 perform as described above. One or more of these processors, as well as the other digital hardware, may be included in a single ASIC, or several processors and various digital hardware may be distributed among several separate components, whether individually packaged or assembled into a SoC.

In some embodiments, a gateway computer program may comprise instructions which, when executed on at least one processor (e.g. the gateway processor 1105), cause the at least one processor to carry out the method steps 1001-1006 in FIG. 10. A gateway carrier may comprise the gateway computer program, and the gateway carrier is one of an electronic signal, optical signal, radio signal or computer readable storage medium.

Figure 12:
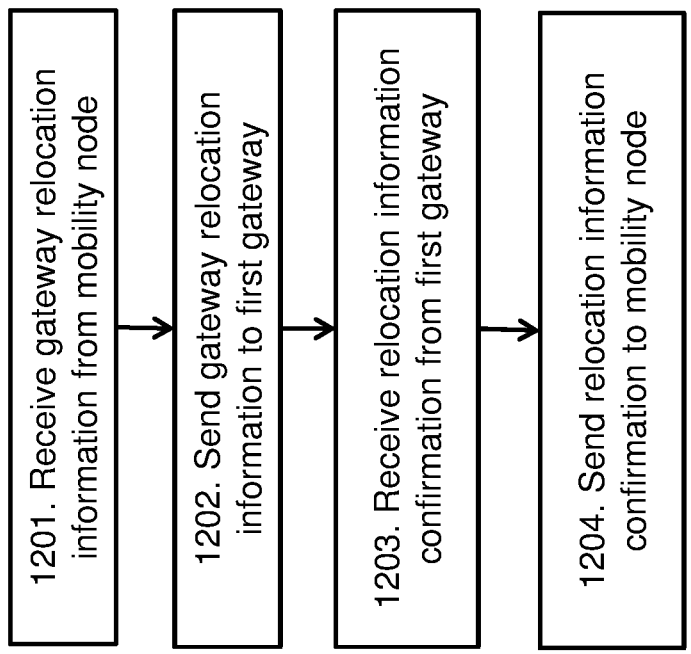
FIG. 12 is a flow chart illustrating embodiments of a method performed by the SGW.

The method described above will now be described seen from the perspective of the SGW 105. FIG. 12 is a flowchart describing the present method performed by the SGSN 105, for handling network connections for the UE 101. The UE 101 is simultaneously connected to the first gateway 408a via a connection to a 3GPP network 401 and a connection to a non-3GPP network 115. The method in FIG. 12 comprises at least some of the following steps to be performed by the SGW 105, which steps may be performed in any other suitable order than described below:

Step 1201
This step corresponds to step 504 in FIG. 5a and step 603 in FIG. 6. The SGW 105 may receive relocation information from the mobility node 410. The relocation information may be received in a Delete Session Request message. The relocation information may be in the form of an IE or a CC indicating that a gateway relocation is required.

Step 1202
This step corresponds to step 504 in FIG. 5a and step 604 in FIG. 6. The SGW 105 may transmit the relocation information to the first gateway 408a. This may also be described as the SGW 105 forwards the relocation information to the first gateway 408a. The relocation information may be sent in a Delete Session Request message or in a Proxy Binding Update message to the first gateway 408a. The relocation information may be in the form of an IE or a CC indicating that a gateway relocation is required.

Step 1203
This step corresponds to step 505 in FIG. 5a and step 605 in FIG. 6. The SGW 105 may receive a relocation information confirmation from the first gateway 408a which confirms the reception of the relocation information confirmation. The relocation information confirmation may be received in a Delete Session Response message or in a Proxy Binding Acknowledgement message.

Step 1204
This step corresponds to step 505 in FIG. 5a and step 606 in FIG. 6. The SGW 105 may transmit the relocation information confirmation to the mobility node 410. This may also be described as the SGW 105 forwarding the relocation information confirmation from step 1203 to the mobility node 410. The relocation information confirmation may be sent in a Delete Session Response message.

Figure 13:
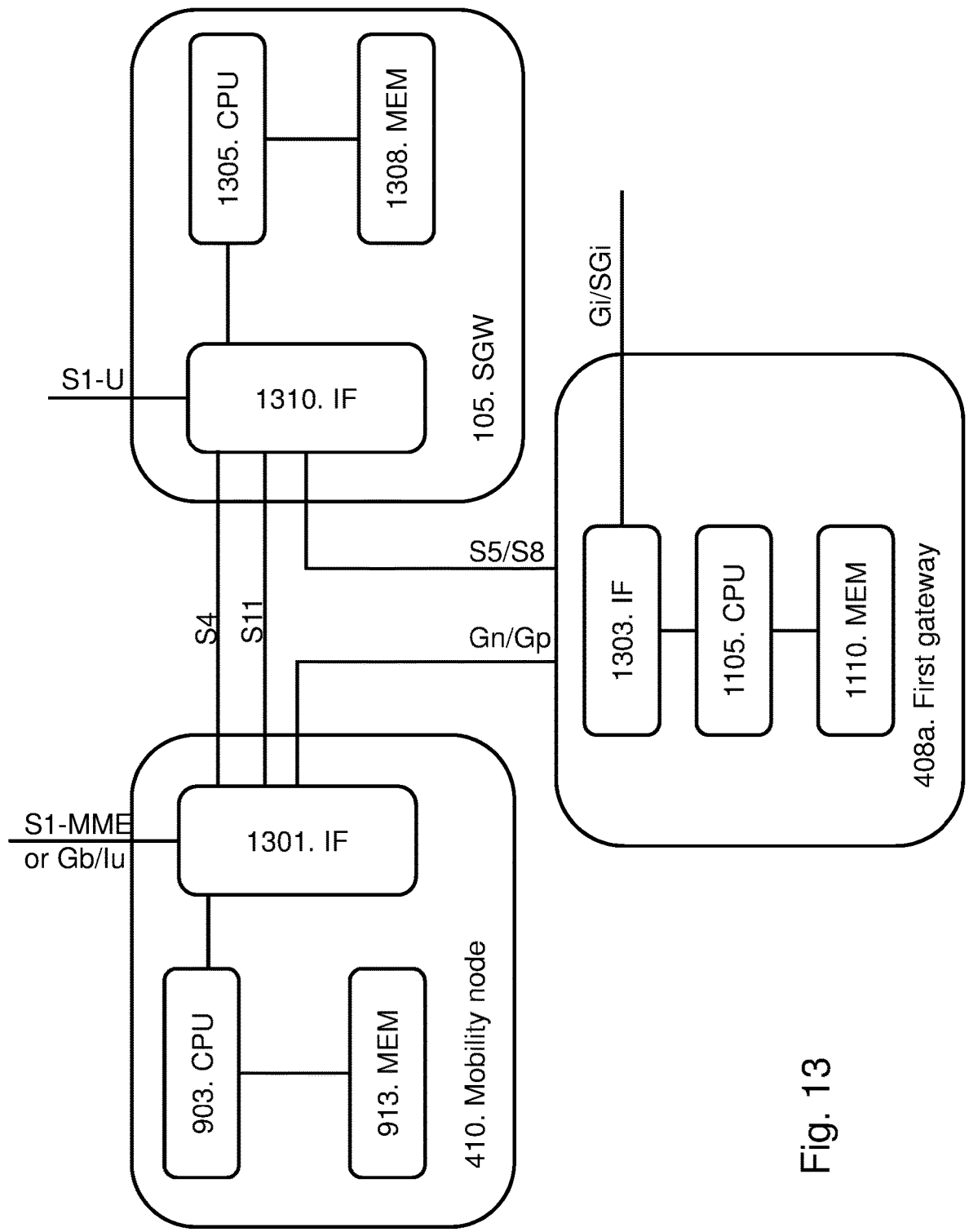
FIG. 13 is a schematic block diagram illustrating embodiments of the mobility node, the first gateway and the SGW.

FIG. 13 is a schematic block diagram illustrating an example of the mobility node 410, the SGW 105 and the gateway 408. As mentioned earlier, the mobility node 410 comprises a mobility processor 903 (indicated as Central Processing Unit (CPU) in FIG. 13), a mobility memory 913 (indicated as MEM in FIG. 13). The mobility node 410 may also comprise an Interface (IF) 1301 which is adapted to be the interface of the mobility node 410 towards other nodes such as e.g. the SGW 105 and the gateway 408. The interface between the mobility node 410 and the gateway 408 may be a Gn/Gp interface, the interface between the mobility node 410 and the SGW 105 may be a S11 or an S4 interface and the interface between the mobility node 410 and e.g. an eNB may be an S1-MME interface or a Gb/Iu interface.

The gateway 408 comprises a gateway processor 1105 (indicated as CPU in FIG. 13), a gateway memory 1110 (indicated as MEM in FIG. 13). The gateway 408 may also comprise an Interface (IF) 1303 which is adapted to be the interface of the gateway 408 towards other nodes such as e.g. the SGW 105 and the mobility node 410. The interface between gateway 408 and the SGW 105 may be a S5 or an S8 interface and the interface between the gateway 408 and an external network e.g. a PDN, may be a Gi or SGi interface.

The SGW 105 comprises a SGW processor 1305 (indicated as CPU in FIG. 13), a SGW memory 1308 (indicated as MEM in FIG. 13) and a SGW IF 1310 which is adapted to be the interface of the SGW 105 towards other nodes such as e.g. the gateway 408 and the mobility node 410. The interface between SGW 105 and an eNB may be an S1-U interface.

As mentioned earlier, the nodes and entities illustrated in FIGS. 4, 9, 11 and 12 may be implemented in separate units or they may be implemented as function in one or more common entities in the wireless communications network 400.

The present mechanism for handling network connections for a UE 101 may be implemented through one or more processors, such as a mobility processor 903 in the mobility node arrangement depicted in FIG. 9 and the gateway processor 1105 in the gateway node arrangement depicted in FIG. 11 together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the mobility node 410 and the first gateway 408a. One such carrier may be in the form of a CD ROM disc. It is however feasible with other data carriers such as a memory stick. The computer program code can furthermore be provided as pure program code on a server and downloaded to at least one of the mobility node 410 and the first gateway 408a.

Summarized, the embodiments herein provide the possibility of gateway 408 relocation when IFOM or NB-IFOM is deployed, which optimizes user plane transmission and avoids hanging resources in the old or previous gateway (e.g. the first gateway 408a) and its peers. Using other words, the embodiments relates to PDN disconnection in IFOM or NB-IFOM with SIPTO.

Disconnection of a PDN connection, when IFOM or NB-IFOM is used in a non-3GPP and 3GPP interworking architecture, is performed by releasing the non-3GPP access 115 together with release of the 3GPP access 401. This can be achieved by transmitting a special indication (new cause code or new information element) to the first gateway 408a, when the mobility node 410 determines to release the 3GPP access 401. After receiving such indication, the first gateway 408a will further release the non-3GPP access 401 by performing e.g. a DSMIPv6 release procedure or any other suitable release procedure such as e.g. NB-IFOM.

For IFOM with a client based solution (as depicted in step 607 in FIG. 6 and step 705 in FIG. 7), the DSMIPv6 shall be supported and used by the UE 101 for IP flow mobility. For NB-IFOM, the DSMIPv6 is not required. In NB-IFOM, other existing protocols in the non-3GPP network 115 is re-used for the release procedure, The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "adapted to" used herein may also be referred to as "arranged to", "configured to", "capable of" or "operable to".

It should also be emphasised that the steps of the methods defined in the appended claims may, without departing from the embodiments herein, be performed in another order than the order in which they appear in the claims.

What is claimed is:

1. A method performed by a mobility node for handling network connections for a User Equipment, UE, wherein the UE is simultaneously connected to a first gateway via a connection to a Third Generation Partnership Project, 3GPP, network and a connection to a non-3GPP network, the method comprising:
    detecting that the UE has moved to another location;
    when it is detected that the UE has moved to another location, selecting a second gateway that the UE should be relocated to, wherein the second gateway is closer to the UE at the other location; and
    transmitting relocation information to the first gateway, wherein the relocation information indicates that a gateway relocation to the second gateway is required for the UE, and wherein the gateway relocation involves deactivation of both the connection to the 3GPP network and the connection to the non-3GPP network.

2. The method according to claim 1, further comprising:
    transmitting, to the UE, 3GPP deactivation instructions to deactivate the connection to the 3GPP network.

3. The method according to claim 1, further comprising:
    receiving, from the UE, a confirmation of the received 3GPP deactivation instruction; and/or
    receiving, from the first gateway, a confirmation of that the relocation information has been received.

4. The method according to claim 3, wherein the confirmation of that the relocation information has been received is received from the first gateway via a Serving GateWay, SGW or via a Gateway General packet radio service Support Node, GGSN.

5. The method according to claim 3, wherein the confirmation of that the relocation information has been received is received in a General packet radio service, GPRS, Tunneling Protocol, GTP, Delete Session Response message or a Proxy Mobile Internet Protocol version 6, PMIPv6, Proxy Binding Acknowledgement message between a Serving GateWay, SGW, and the first gateway and in a GTP Delete Session Response message between the SGW and the mobility node; or
    wherein the confirmation of that the relocation information has been received is received in a Delete Packet Data Protocol, PDP, Context Response message between the first gateway and the mobility node.

6. The method according to claim 1, wherein the relocation information is transmitted to the first gateway via a Serving GateWay, SGW or via a Gateway General packet radio service Support Node, GGSN.

7. The method according to claim 1, wherein the relocation information is comprised in a General packet radio service, GPRS, Tunneling Protocol, GTP, Delete Session Request message between the mobility node and a Serving GateWay, SGW, and in a GTP Delete Session Request message or a Proxy Binding Update message between the SGW and the first gateway; or
    wherein the relocation information is comprised in a Delete Packet Data Protocol, PDP, Context Request between the mobility node and the first gateway.

8. The method according to claim 1, wherein the relocation information is an Information Element, IE, or a Cause Code, CC.

9. The method according to claim 1, wherein the deactivation requires reactivation of the connection to the 3GPP network.

10. The method according to claim 1, wherein the UE and the first gateway support Internet Protocol Flow Mobility, IFOM or Network Based-IFOM, NB-IFOM.

11. The method according to claim 1, wherein the UEs connection to the non-3GPP network is deactivated with a Dual Stack Mobile Internet Protocol version 6, DSMIPv6, release procedure.

12. The method according to claim 11, wherein an Internet Protocol, IP, address of the UE is used as a Home of Address, HoA, for the DSMIPv6 release procedure, wherein the IP address is allocated to the UE by the first gateway.

13. A method performed by a first gateway for handling network connections for a User Equipment, UE, wherein the UE is simultaneously connected to the first gateway via a connection to a Third Generation Partnership Project, 3GPP, network and a connection to a non-3GPP network, the method comprising:
receiving relocation information from a mobility node, wherein the relocation information indicates that a gateway relocation to a second gateway is required for the UE;
determining whether the first gateway has both 3GPP and non-3GPP connections for a same Packet Data Network, PDN;
when the first gateway has both 3GPP and non-3GPP connections, determining, based on the received relocation information, whether that the connection to the non-3GPP network should be deactivated; and
transmitting non-3GPP deactivation instructions to the UE to deactivate its connection to the non-3GPP network.

14. The method according to claim 13, further comprising:
transmitting, to the mobility node, a relocation information confirmation of that the relocation information has been received.

15. The method according to claim 14, wherein the relocation information confirmation is transmitted to the mobility node via a Serving GateWay, SGW or via a Gateway General packet radio service Support Node, GGSN.

16. The method according to claim 13, wherein the relocation information confirmation is transmitted in a Delete Session Response message or a Proxy Binding Acknowledgement message between the first gateway and a Serving GateWay, SGW, and in a Delete Session Response message between the SGW and the mobility node; or
wherein the confirmation of that the relocation information has been received is transmitted in a Delete Packet Data Protocol, PDP, Context Response message between the first gateway and the mobility node.

17. The method according to claim 13, wherein the UEs connection to the non-3GPP network is deactivated with a Dual Stack Mobile Internet Protocol version 6, DSMIPv6, release procedure.

18. The method according to claim 13, wherein the UE and the first gateway support Internet Protocol Flow Mobility, IFOM, or Network Based-IFOM, NB-IFOM.

19. A mobility node for handling network connections for a User Equipment, UE, wherein the UE is adapted to be simultaneously connected to a first gateway via a connection to a Third Generation Partnership Project, 3GPP, network and a connection to a non-3GPP network, the mobility node being adapted to:
detect that the UE has moved to another location;
when it is detected that the UE has moved to another location, select a second gateway that the UE should be relocated to, wherein the second gateway is closer to the UE at the other location; and to
transmit relocation information to the first gateway, wherein the relocation information indicates that a gateway relocation to the second gateway is required for the UE, and wherein the gateway relocation involves deactivation of both the connection to the 3GPP network and the connection to the non-3GPP network.

20. The mobility node according to claim 19, being further adapted to:
transmit, to the UE, 3GPP deactivation instructions to deactivate the connection to the 3GPP network.

21. A first gateway for handling network connections for a User Equipment, UE, wherein the UE is adapted to be simultaneously connected to the first gateway via a connection to a Third Generation Partnership Project, 3GPP, network and a connection to a non-3GPP network, the first gateway being adapted to:
receive relocation information from a mobility node, wherein the relocation information indicates that a gateway relocation to a second gateway is required for the UE;
determine whether the first gateway has both 3GPP and non-3GPP connections for a same Packet Data Network, PDN;
when the first gateway has both 3GPP and non-3GPP connections, determine, based on the received relocation information, that the connection to the non-3GPP network should be deactivated; and to
transmit non-3GPP deactivation instructions to the UE to deactivate its connection to the non-3GPP network.

22. The first gateway according to claim 21, being further adapted to:
transmit, to the mobility node, a relocation information confirmation of that the relocation information has been received.

* * * * *